(12) United States Patent
Herman et al.

(10) Patent No.: US 11,458,484 B2
(45) Date of Patent: Oct. 4, 2022

(54) SEPARATION ASSEMBLY WITH A SINGLE-PIECE IMPULSE TURBINE

(71) Applicant: Cummins Filtration IP, Inc., Columbus, IN (US)

(72) Inventors: Peter K. Herman, Stoughton, WI (US); Arun P. Janakiraman, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 791 days.

(21) Appl. No.: 16/465,931

(22) PCT Filed: Dec. 1, 2017

(86) PCT No.: PCT/US2017/064268
§ 371 (c)(1),
(2) Date: May 31, 2019

(87) PCT Pub. No.: WO2018/106539
PCT Pub. Date: Jun. 14, 2018

(65) Prior Publication Data
US 2020/0061638 A1    Feb. 27, 2020

Related U.S. Application Data

(60) Provisional application No. 62/430,014, filed on Dec. 5, 2016.

(51) Int. Cl.
*B04B 9/06* (2006.01)
*B04B 5/00* (2006.01)
*F03B 1/02* (2006.01)

(52) U.S. Cl.
CPC ............. *B04B 9/06* (2013.01); *B04B 5/005* (2013.01); *F03B 1/02* (2013.01); *F05B 2240/2411* (2013.01)

(58) Field of Classification Search
CPC ... B04B 9/06; B04B 5/005; F03B 1/02; F05B 2240/2411
See application file for complete search history.

(56) References Cited

U.S. PATENT DOCUMENTS

| 391,523 A | 10/1888 | Englebright |
| 417,865 A | 12/1889 | Green |

(Continued)

FOREIGN PATENT DOCUMENTS

| CN | 101012838 A | 8/2007 |
| CN | 201025219 Y | 2/2008 |

(Continued)

OTHER PUBLICATIONS

First Office Action issued for Chinese Patent Application No. 201880006007.0, dated Feb. 26, 2021, 9 pages.

(Continued)

*Primary Examiner* — Pedro J Cuevas
(74) *Attorney, Agent, or Firm* — Foley & Lardner LLP

(57) ABSTRACT

A separation assembly comprises a housing, a jet that expels a fluid within the housing, and a turbine positioned within the housing. The fluid causes the turbine to rotate about a center rotational axis within the housing. The turbine comprises a first axial end, a second axial end, and a plurality of vanes extending axially relative to the center rotational axis from the first axial end to the second axial end. The plurality of vanes defines axially-extending channels between each of the plurality of vanes. The first axial end comprises a radially-extending structure that axially blocks the flow of the fluid through the first axial end. The second axial end does not comprise any structure that axially blocks the flow of the fluid through the second axial end.

28 Claims, 24 Drawing Sheets

(56) References Cited

U.S. PATENT DOCUMENTS

| | | | |
|---|---|---|---|
| 807,975 A | 12/1905 | Stumpf | |
| 1,681,705 A | 8/1928 | Moody | |
| 2,390,506 A | 12/1945 | Buchi | |
| 2,577,179 A | 1/1951 | Buchi | |
| 2,607,438 A | 8/1952 | Bailey | |
| 2,663,541 A | 12/1953 | Geen | |
| 3,041,039 A | 6/1962 | Ambroz | |
| 3,286,984 A * | 11/1966 | Bachl | F01D 1/34 415/199.3 |
| 3,802,046 A * | 4/1974 | Wachtell | F01D 9/045 416/213 A |
| 4,057,370 A * | 11/1977 | Numata | F04D 29/441 417/423.2 |
| 4,065,233 A * | 12/1977 | Torigoe | F04D 25/082 417/423.2 |
| 4,279,624 A | 7/1981 | Wilson | |
| 4,382,746 A * | 5/1983 | Retz | F03B 1/02 415/90 |
| 4,634,344 A | 1/1987 | Zagar et al. | |
| 4,669,952 A * | 6/1987 | Forsyth, III | F04D 29/444 415/119 |
| 5,263,814 A * | 11/1993 | Jang | F01D 1/32 415/80 |
| 5,296,769 A * | 3/1994 | Havens | F04D 29/444 310/90 |
| 5,611,668 A | 3/1997 | Yapp et al. | |
| 6,017,300 A | 1/2000 | Herman | |
| 6,019,717 A | 2/2000 | Herman | |
| 6,213,929 B1 | 4/2001 | May | |
| 6,508,628 B2 | 1/2003 | Amr | |
| 6,572,336 B2 | 6/2003 | Horng et al. | |
| 6,925,993 B1 | 8/2005 | Eliasson et al. | |
| 8,734,097 B2 * | 5/2014 | Kenyon | F04D 25/0606 415/206 |
| 9,322,307 B2 | 4/2016 | Andersson Aginger | |
| 9,677,563 B2 * | 6/2017 | Kenyon | F04D 29/281 |
| 10,605,246 B2 * | 3/2020 | Kenyon | A61M 16/0066 |
| 11,173,500 B2 * | 11/2021 | Scheckel | B01D 19/0052 |
| 2002/0098083 A1 | 7/2002 | Blangetti et al. | |
| 2003/0185682 A1 | 10/2003 | Lei et al. | |
| 2004/0213675 A1 | 10/2004 | Blangetti et al. | |
| 2004/0219022 A1 | 11/2004 | Yang | |
| 2006/0003882 A1 | 1/2006 | Smith | |
| 2006/0039791 A1 | 2/2006 | Kim | |
| 2006/0093485 A1 | 5/2006 | Horng et al. | |
| 2009/0175729 A1 | 7/2009 | Sun | |
| 2011/0180051 A1 | 7/2011 | Schwandt et al. | |
| 2013/0032646 A1 | 2/2013 | Dhiman et al. | |
| 2013/0056407 A1 | 3/2013 | Parikh et al. | |
| 2013/0094939 A1 | 4/2013 | Farb et al. | |
| 2013/0327010 A1 | 12/2013 | Muller et al. | |
| 2014/0147631 A1 | 5/2014 | Yang et al. | |
| 2015/0003996 A1 | 1/2015 | Krishna et al. | |
| 2015/0037134 A1 | 2/2015 | Isaev | |
| 2015/0203687 A1 | 7/2015 | Pardon et al. | |
| 2015/0246477 A1 | 9/2015 | Bormashenko et al. | |
| 2016/0169226 A1 | 6/2016 | Jenkins et al. | |
| 2020/0061638 A1 * | 2/2020 | Herman | B04B 9/06 |
| 2020/0171420 A1 * | 6/2020 | Holm | B01D 46/0031 |
| 2021/0039115 A1 * | 2/2021 | Herman | B04B 1/08 |
| 2021/0102522 A1 * | 4/2021 | Parikh | B04B 5/12 |
| 2021/0121896 A1 * | 4/2021 | Scheckel | B01D 19/0031 |
| 2021/0404433 A1 * | 12/2021 | Kloster | F03B 13/06 |
| 2021/0404434 A1 * | 12/2021 | Kloster | F03B 13/10 |

FOREIGN PATENT DOCUMENTS

| | | | |
|---|---|---|---|
| CN | 103879084 | 6/2014 | |
| EP | 2 638 944 | 9/2013 | |
| GB | 0 468 557 A | 7/1937 | |
| GB | 0 938 967 A | 10/1963 | |
| GB | 2 058 941 | 4/1981 | |
| GB | 2 455 816 | 6/2009 | |
| WO | WO-2007/110059 | 10/2007 | |
| WO | WO-2009/050462 A2 | 4/2009 | |
| WO | WO-2016/200928 A1 | 12/2016 | |
| WO | WO-2018106539 A1 * | 6/2018 | B04B 5/005 |
| WO | WO-2019152879 A2 * | 8/2019 | B04B 1/08 |
| WO | WO-2019204265 A1 * | 10/2019 | B01D 46/0056 |

OTHER PUBLICATIONS

Office Action issued for Chinese Patent Application No. CN 2019800167481, dated Sep. 23, 2021, 15 pages.

Office Action issued for U.S. Appl. No. 17/044,371, dated Sep. 16, 2021, 30 pages.

Shuming Xing, Melted Metal Die Forging, National Defense Industry Press, Sep. 2011, pp. 221-223.

International Search Report and Written Opinion issued for PCT/US2017/064269, dated Feb. 12, 2018, 8 pages.

International Search Report and Written Opinion for corresponding PCT Application No. PCT/US2018/012762, dated Mar. 26, 2018, pp. 1-7.

International Search Report and Written Opinion from corresponding PCT Application No. PCT/US2019/016406, pp. 1-9.

Non-Final Office Action on U.S. Appl. No. 16/474,742 dated Jul. 7, 2020.

International Search Report and Written Opinion issued for PCT/US2017/064268, dated Feb. 12, 2018, 8 pages.

International Search Report and Written Opinion issued for PCT/US2019/027615, dated Jun. 25, 2019, 18 pages.

* cited by examiner

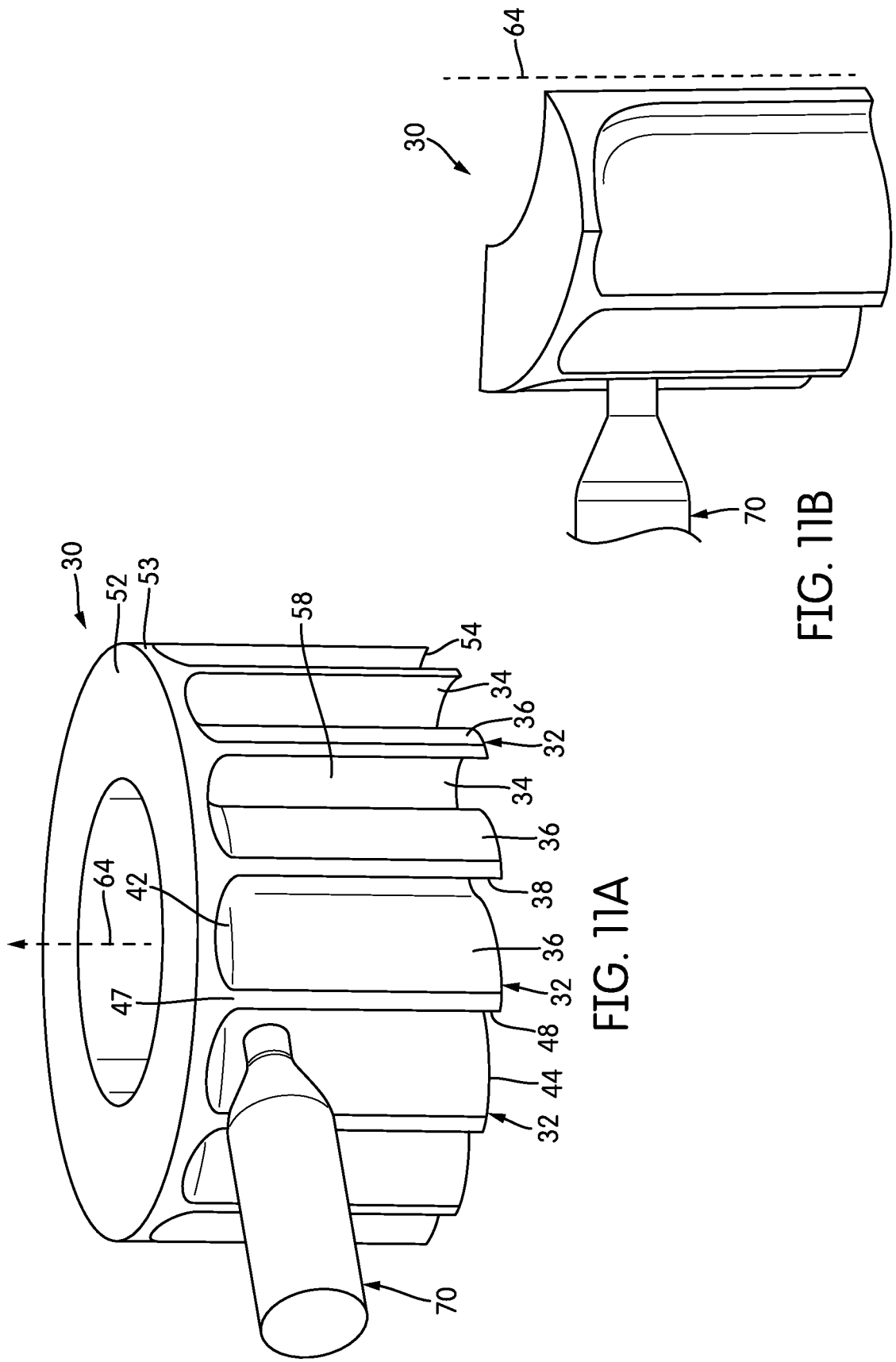

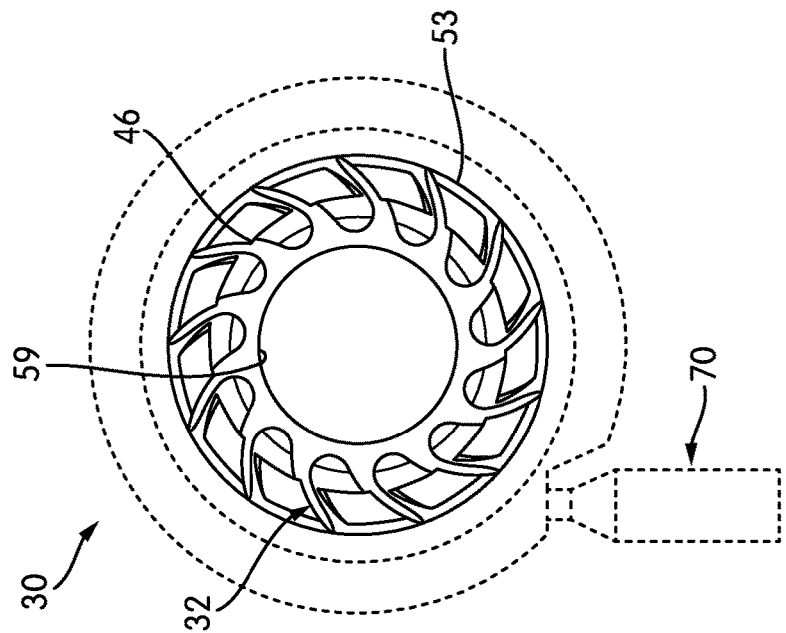
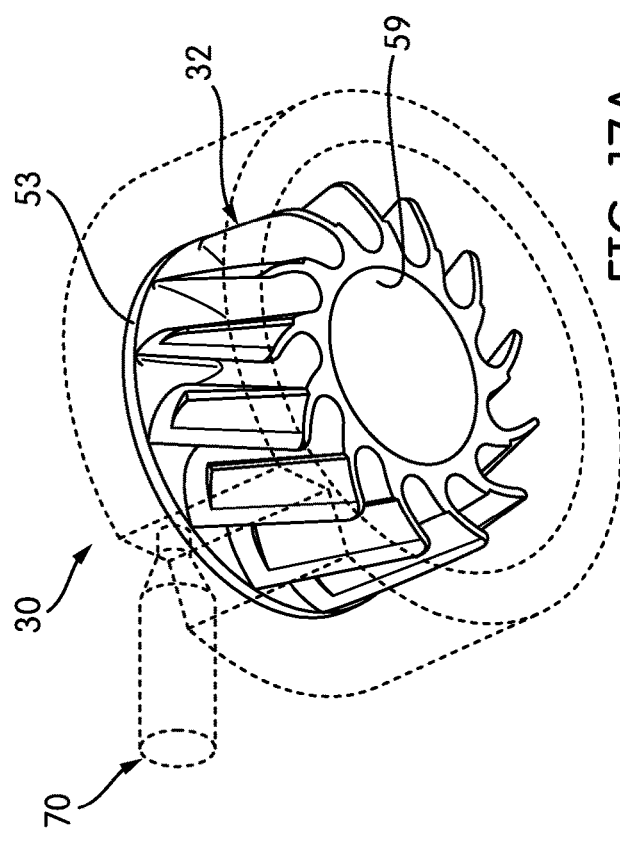
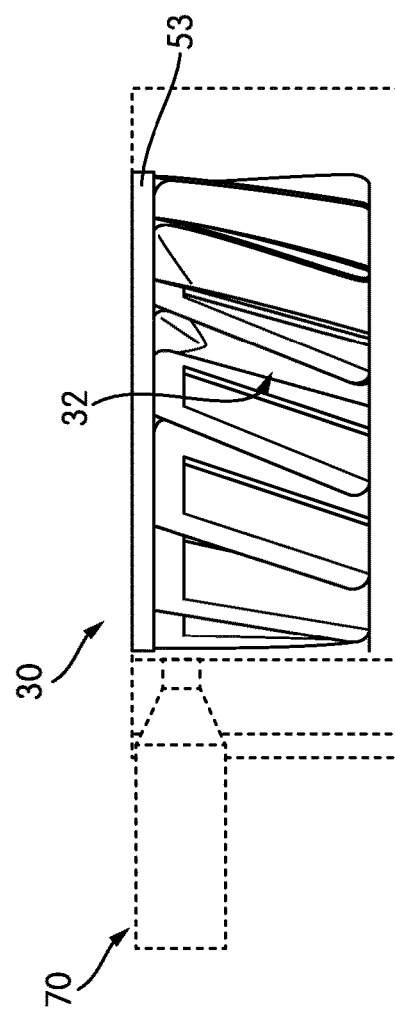
FIG. 17B
FIG. 17A
FIG. 17C

SEPARATION ASSEMBLY WITH A SINGLE-PIECE IMPULSE TURBINE

CROSS REFERENCE TO RELATED APPLICATIONS

The present application is a national stage of PCT Application No. PCT/US2017/064268 filed Dec. 1, 2017 which claims the benefit of and priority to U.S. Provisional Patent Application No. 62/430,014, filed Dec. 5, 2016. The contents of both applications are incorporated herein by reference in their entirety.

FIELD

The present invention relates generally to impulse turbines.

BACKGROUND

An impulse turbine assembly is a rotary system, where the flow of fluid from a jet rotates a turbine, thereby converting hydraulic energy from the flow of fluid into rotational energy. Accordingly, impulse turbine assemblies can be used to power various devices.

FIGS. 1-6 show various examples of conventional impulse turbine assemblies 130. FIG. 1 is an example of a conventional turbine assembly 130 that has a Turgo-style with a nearly-tangential jet 170 (with slight axial-downward tilt-angle) that expels fluid 172. FIG. 2 is an example of another conventional turbine assembly 130 that has a Pelton-style with a "split-bucket" with a tangential jet 170. FIG. 3 is an example of a conventional turbine assembly 130 that has a modified single-bucket Pelton-style turbine with a tangential jet 170 such that the fluid 172 enters through the top and is discharged through the bottom. FIG. 4 is another example a conventional turbine assembly 130 that has a modified "two-part" Pelton-style turbine. FIGS. 5-6 show other examples of conventional turbine assemblies 130.

As shown in FIGS. 1-6, each of the conventional turbine assemblies 130 comprises "reverse draft" or undercut geometry features 142 (including a bottom plate) that create a "closed bottom" or a "closed end" on both the top and bottom of the conventional turbine assembly 130. However, these undercut geometry features 142 cause the vane/bucket curvature of the conventional turbine assemblies 130 to be relatively complex, which prevents the conventional turbine assembly 130 from being molded as one piece and necessitates multi-part conventional turbine assemblies 130. Accordingly, the undercut geometry features 142 causes the conventional turbine assemblies 130 to comprise at least two parts or pieces (or even 20 parts) that are assembled together, which increases the complexity and cost of the conventional turbine assembly 130.

For example, due to the geometry of the undercut geometry features 142, the conventional turbine assemblies 130 require at least two components or parts to be assembled together in order to create or produce a conventional turbine assembly 130. As shown in FIG. 4, the conventional turbine assembly 130 may be a two-part turbine assembly with a split 144 along a substantially horizontal radial plane in the center or middle region of the turbine assembly 130 between the top half and the bottom half of the conventional turbine assembly 130. The top half and the bottom half of the conventional turbine assembly 130 may be attached to each other to create the conventional turbine assembly 130.

Alternatively, due to the undercut geometry features 142, a conventional turbine assembly 130 may require dozens of parts (e.g., more than 15 parts) to be assembled together. For example, the conventional turbine assembly 130 may have a separate part for each bucket or blade, which may be assembled with a hub, which is normal practice for existing hydroelectric turbine runners of conventional turbine assemblies 130.

SUMMARY

Various embodiments provide for a separation assembly that comprises a housing, a jet that expels a fluid within the housing, and a turbine positioned within the housing. The fluid causes the turbine to rotate about a center rotational axis within the housing. The turbine comprises a first axial end, a second axial end, and a plurality of vanes extending axially relative to the center rotational axis from the first axial end to the second axial end. The plurality of vanes defines axially-extending channels between each of the plurality of vanes. The first axial end comprises a radially-extending structure that axially blocks the flow of the fluid through the first axial end. The second axial end is axially open such that fluid can flow unblocked axially through the second axial end.

Various other embodiments provide for a turbine for a separation assembly that is positioned to be contacted by fluid expelled by a jet. The turbine comprises a first axial end, a second axial end, and a plurality of vanes. The first axial end comprises a radially-extending structure that axially blocks the flow of the fluid through the first axial end. The second axial end is axially open such that the fluid can flow unblocked axially through the second axial end. The plurality of vanes extend axially relative to a center rotational axis from the first axial end to the second axial end. The plurality of vanes define axially-extending channels between each of the plurality of vanes. The fluid causes the turbine to rotate about the center rotational axis.

Still other embodiments provide for a method of making a turbine for a separation assembly. The method comprises forming the turbine as a single-piece of material such that the turbine does not require any assembly of parts. The turbine comprises a first axial end, a second axial end, and a plurality of vanes. The first axial end comprises a radially-extending structure that axially blocks a flow of a fluid from a jet through the first axial end. The second axial end is axially open such that the fluid can flow unblocked axially through the second axial end. The plurality of vanes extend axially relative to a center rotational axis from the first axial end to the second axial end. The plurality of vanes define axially-extending channels between each of the plurality of vanes, the fluid causing the turbine to rotate about the center rotational axis.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 11A is a perspective view of a turbine according to one embodiment that can be used within the separation assembly of FIG. 7A.

FIG. 11B is a cross-sectional view of a portion of the turbine of FIG. 11A.

FIG. 17A is a perspective view of a turbine according to yet another embodiment that can be used within the separation assembly of FIG. 7A.

FIG. 17B is a bottom view of the turbine of FIG. 17A.

FIG. 17C is a side view of the turbine of FIG. 17A.

DETAILED DESCRIPTION

Figure 1:
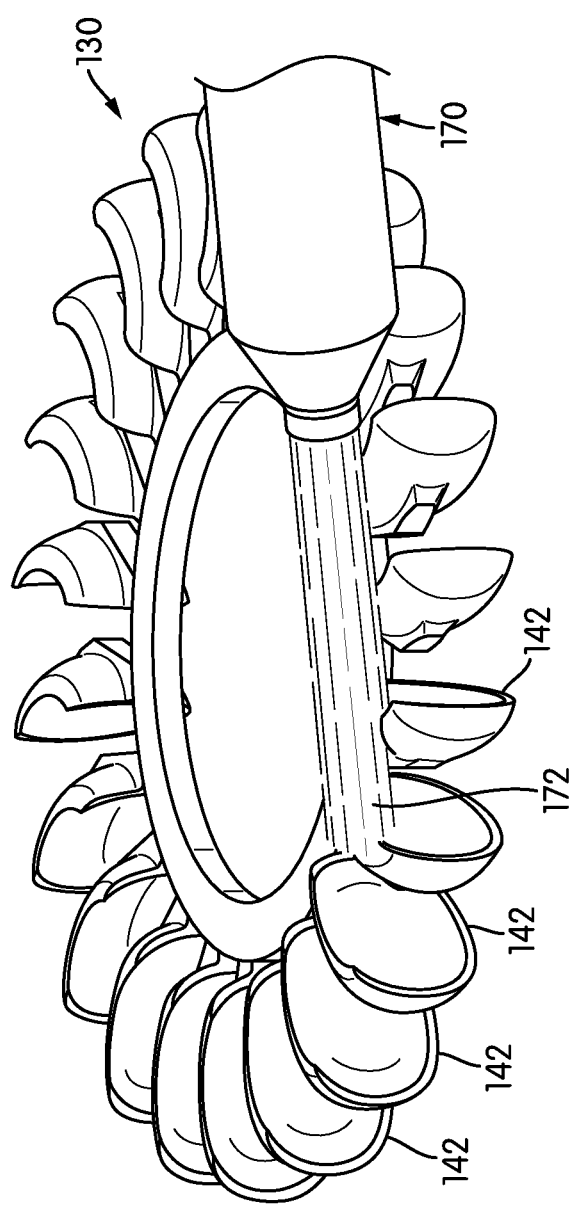
FIG. 1 is a perspective view of a conventional turbine assembly.
Figure 2:
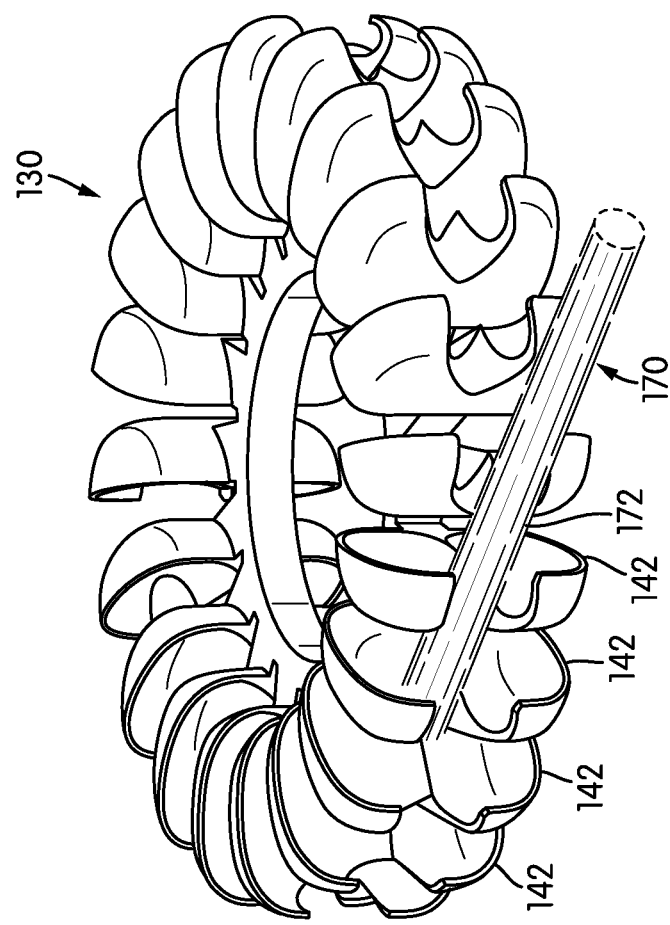
FIG. 2 is a perspective view of a conventional turbine assembly.
Figures 3, 4:
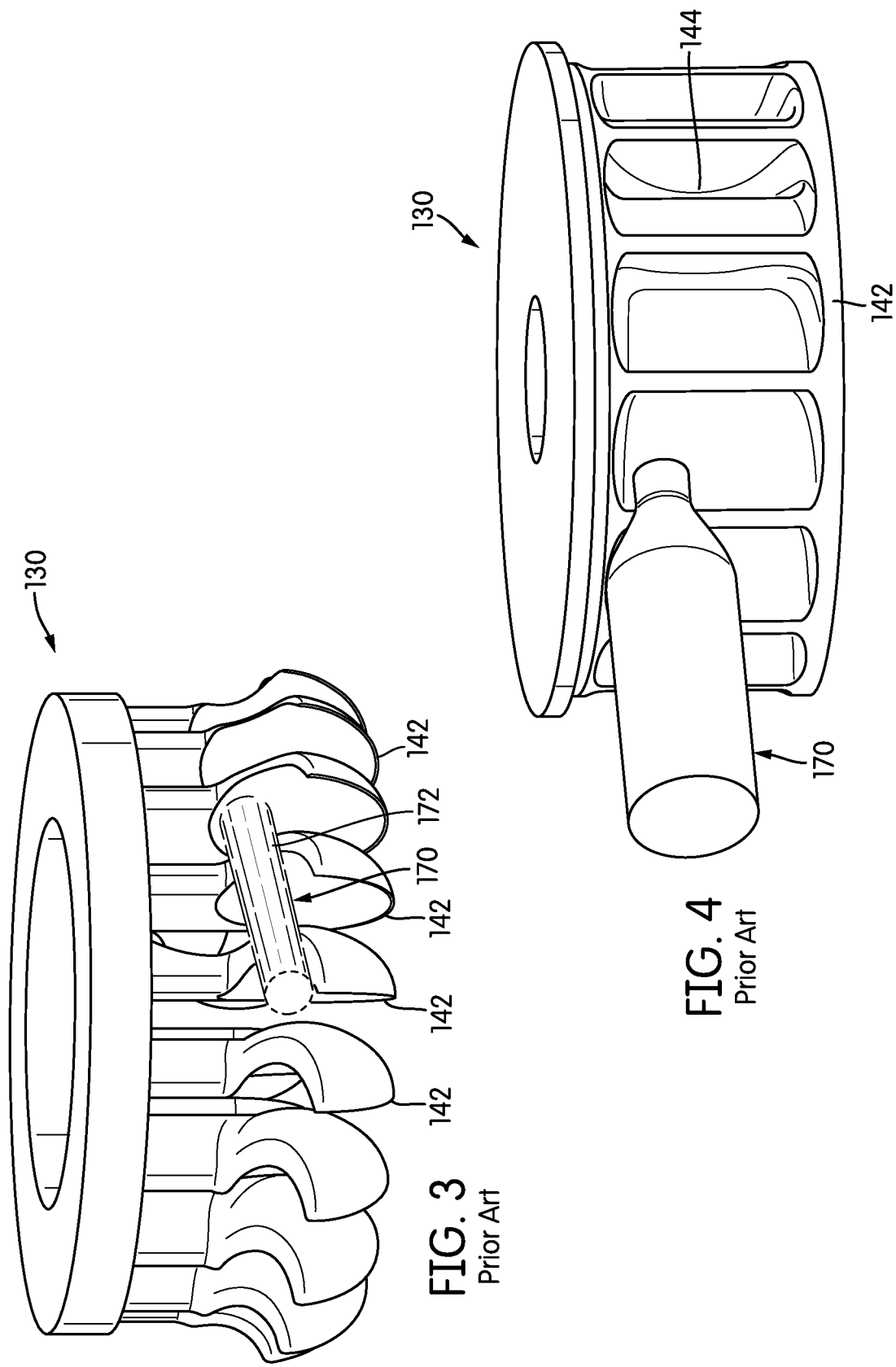
FIG. 3 is a perspective view of a conventional turbine assembly.
FIG. 4 is a perspective view of a conventional turbine assembly.
Figure 6:
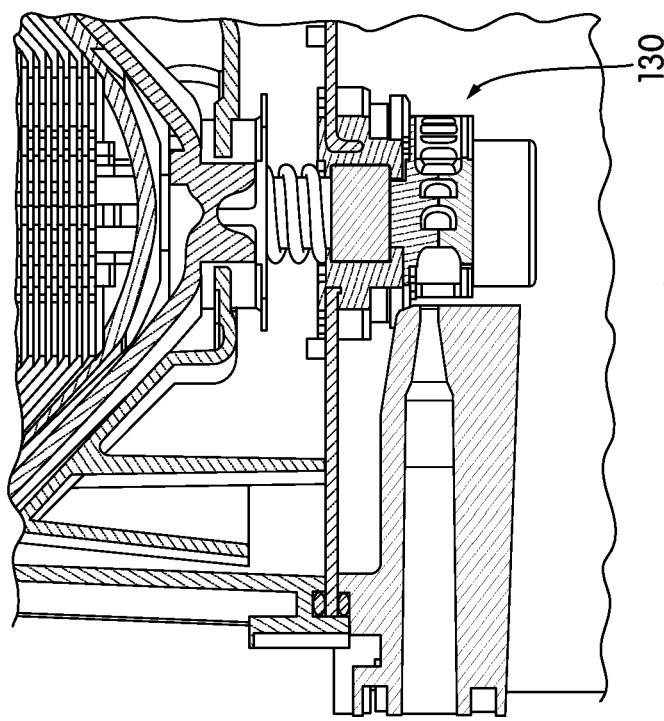
FIG. 6 is a cross-sectional view of a conventional turbine assembly.
Figure 5:
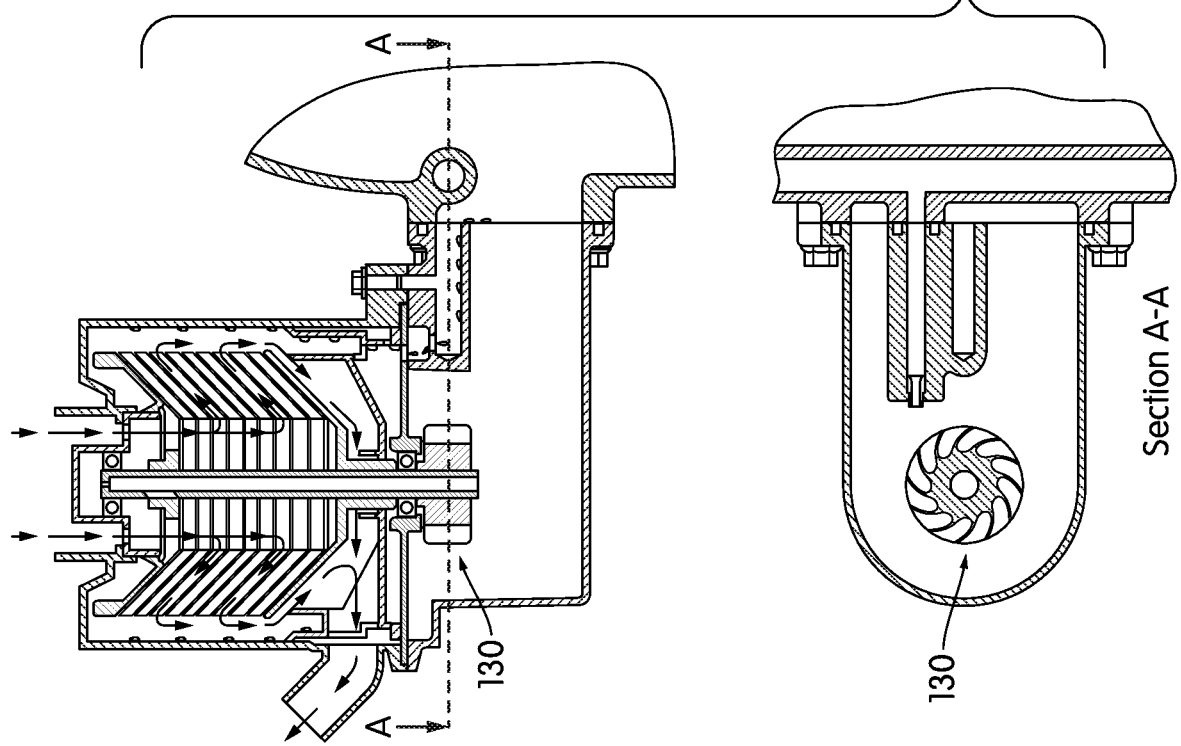
FIG. 5 is cross-sectional views of a conventional turbine assembly.
Figure 7B:
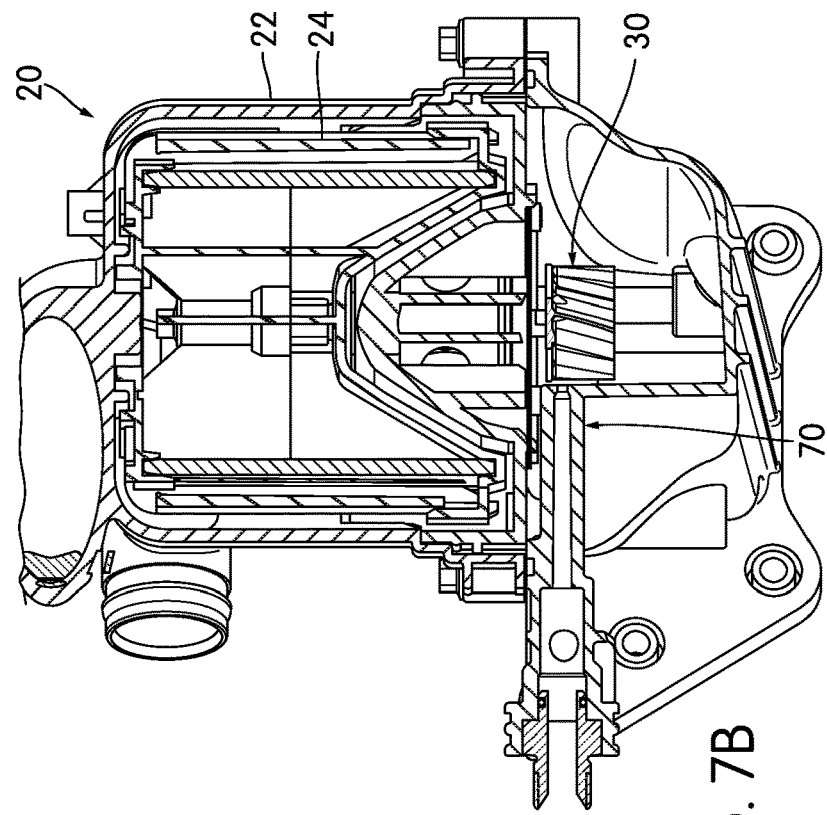
FIG. 7B is a cross-sectional view of the separation assembly of FIG. 7A.
Figure 7A:
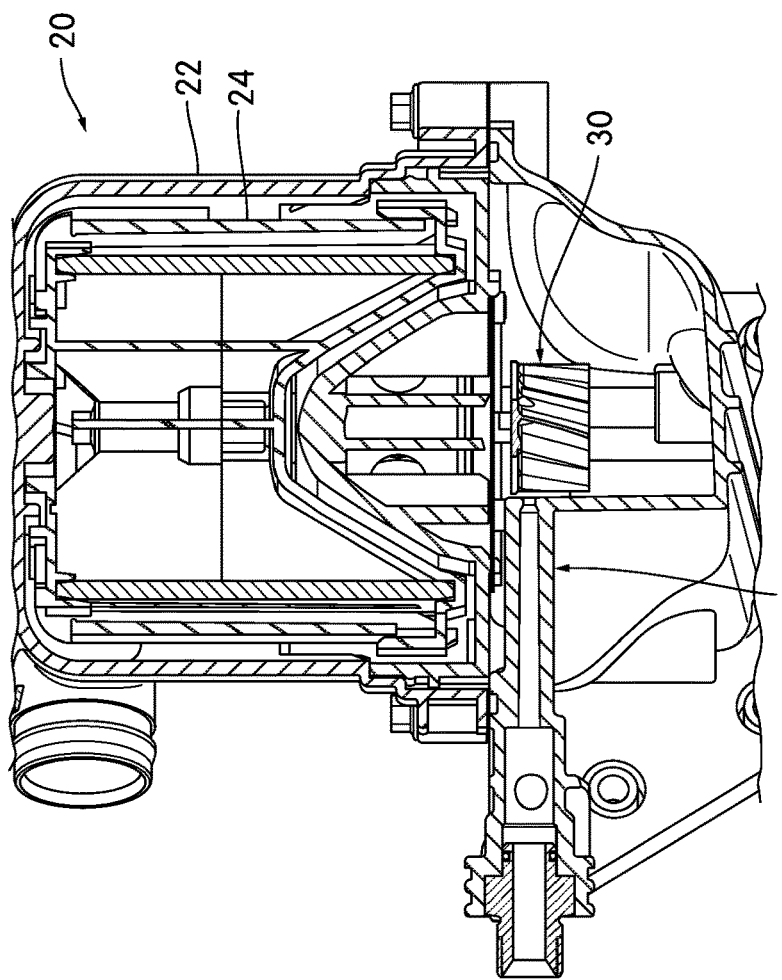
FIG. 7A is a cross-sectional view of a separation assembly according to one embodiment.
Figure 8:
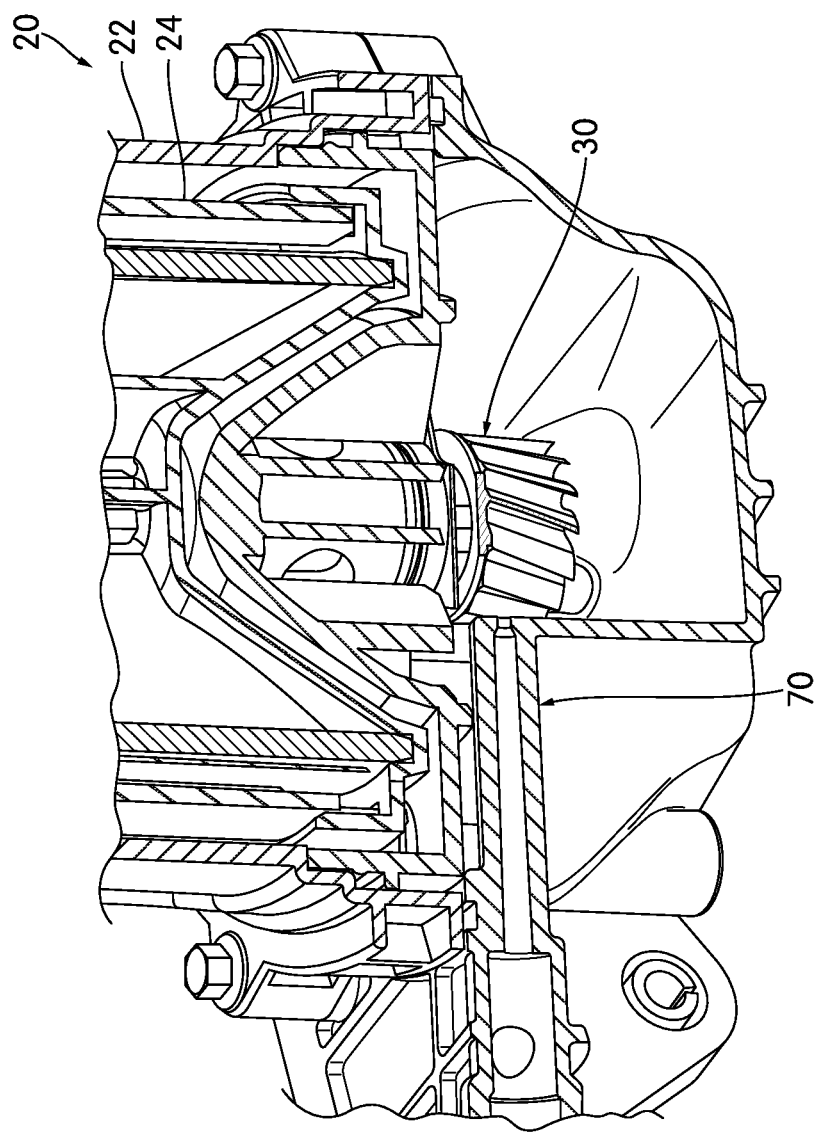
FIG. 8 is a perspective, cross-sectional view of the separation assembly of FIG. 7A.
Figures 9, 10:
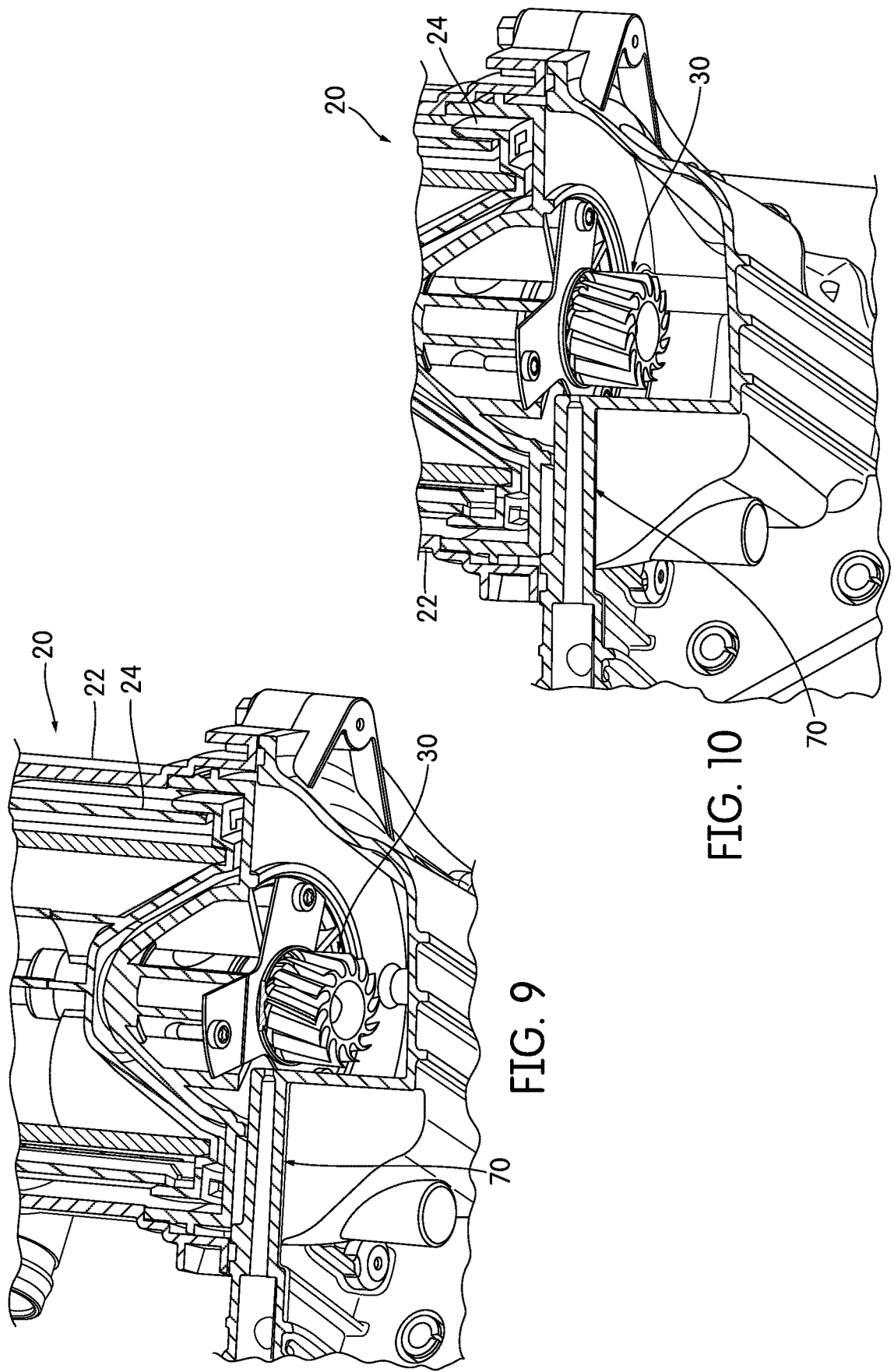
FIG. 9 is a perspective, cross-sectional view of the separation assembly of FIG. 7A.
FIG. 10 is a perspective, cross-sectional view of the separation assembly of FIG. 7A.

Referring to the figures generally, various embodiments disclosed herein relate to a separation assembly with a turbine that is hydraulically driven. The turbine is constructed as a single-piece. Since the turbine is a single, unitary component, the turbine is made from one continuous piece of material and cannot be separated into multiple separate components without damage or destruction of the turbine occurring. Since the turbine has a simple, single-piece design, the turbine is lower cost compared to conventional turbines. The particular structure and profile geometry of the vanes of the turbine allow the turbine to be moldable or extrudable as a single piece, while still maintaining a sufficient hydraulic efficiency.

Separation Assembly

As shown in FIGS. 7A-10, the separation device or assembly 20 comprises a housing 22 with a turbine 30 and a rotor portion 24 that the turbine 30 is configured to rotate. The turbine 30 and the rotor portion 24 are positioned and rotatable within the housing 22. The separation assembly 20 further comprises a tangential nozzle or jet 70 that is configured to expel fluid 72 toward and into the turbine 30 in order to rotate the turbine 30 within the housing 22.

The separation assembly 20 may be used as a variety of different rotating filtration or separation devices, including but not limited to a lube-oil-driven product, a centrifuges (such as a liquid-particle separator), an inertial separator, a lube-oil separator, and an air-oil separator (such as a crankcase ventilation air-oil separator, a crankcase blowby oil separator, or a rotating crankcase air-oil separator). The separation assembly 20 may be used as a lube-oil centrifuge, for example, as described according to one embodiment in U.S. Pat. No. 6,071,300, the entire disclosure of which is incorporated herein by reference. The separation assembly 20 may be used for air filtration and/or for emissions and may be hydraulically driven. Further, the separation assembly 20 may be mounted to or used within an engine.

The rotor portion 24 can comprise a variety of different rotatable portions within the separation assembly 20, and may comprise, for example, cone stack, spiral vane, or media types in order to filter a fluid. The rotor portion 24 is configured to be rotated or driven by the turbine 30.

Jet

As shown in FIGS. 7A-12, 14, and 17A-17C, the pressurized and impinging or impulse fluid jet 70 is positioned near the turbine 30 in order to direct fluid 72 to the turbine 30. As shown in FIGS. 7A-10, the jet 70 may be integrated within a portion of the housing 22. As shown in FIGS. 18A-22B, the jet 70 expels a pressurized fluid 72 (e.g., a drive liquid) toward the turbine 30 to spin, rotate, or otherwise turn the turbine 30. The pressure or flow of the fluid 72 causes the turbine 30 to rotate, thus transferring the kinetic energy (as created by conversion from pressure, per Bernoulli) of the flowing fluid 72 to the turbine 30, which rotates the turbine 30.

Figure 14:
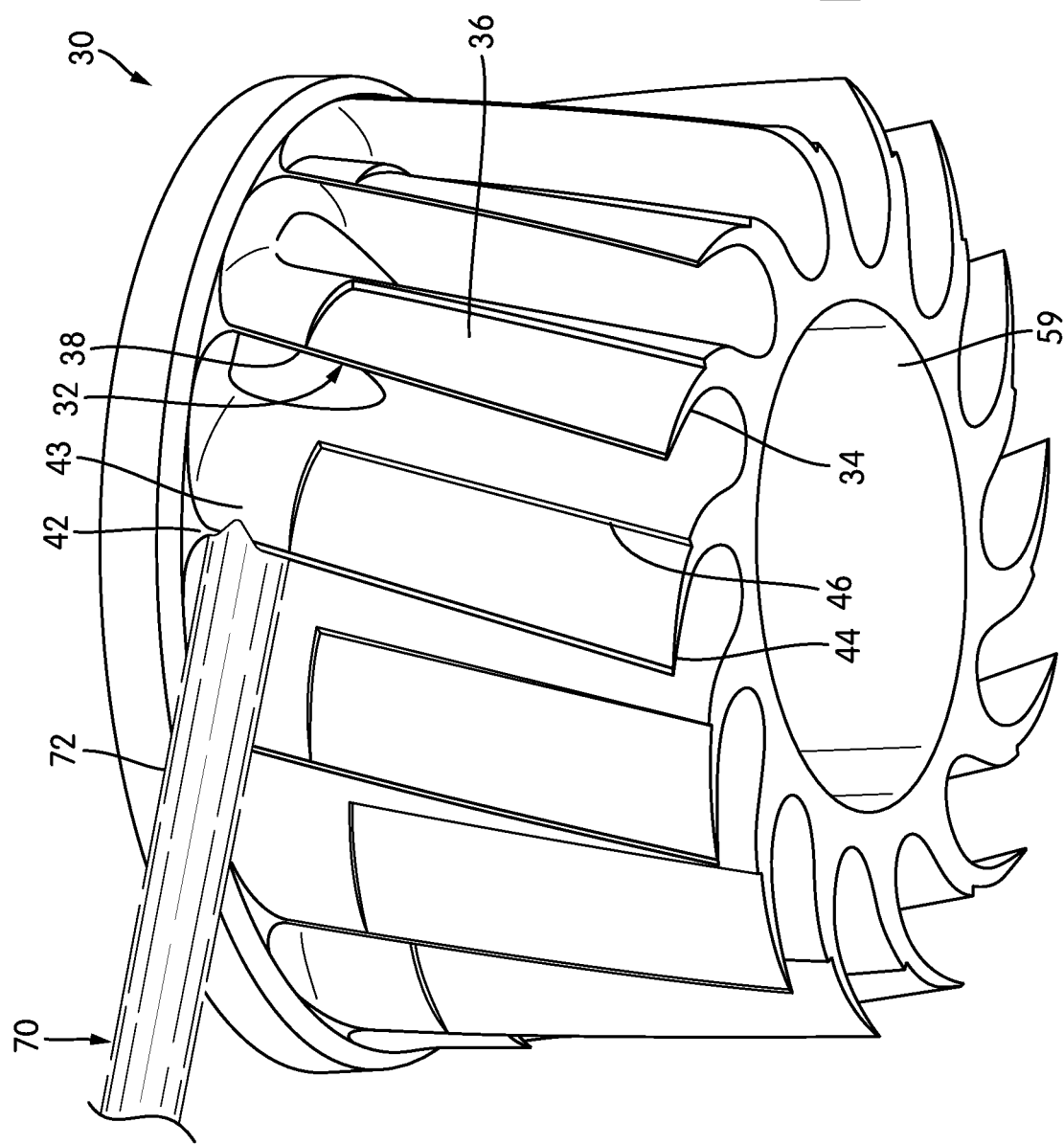
FIG. 14 is a perspective view of a turbine according to still another embodiment that can be used within the separation assembly of FIG. 7A.

The jet 70 directs the fluid 72 toward the jet inlet area or zone 43 on the turbine 30 (as shown, for example, in FIG. 14). The jet inlet zone 43 is an area along the turbine 30 where the jet 70 is expelling the fluid 72 onto the turbine 30. Accordingly, the jet inlet zone 43 may be positioned directly beneath the radially-extending structure 53 of the first axial end 52 of the turbine 30. Accordingly, the jet 70 is positioned toward one end of the turbine 30 (e.g., toward the first axial end 52 of the turbine 30) such that the jet 70 directs fluid directly beneath the radially-extending structure 52 and the fluid 72 can flow from the first axial end 52 toward the second axial end 54 of the turbine 30.

The jet 70 may be positioned relative to the turbine 30 such that the flow of fluid 72 is tangential to the pitch-diameter of turbine 30. According to one embodiment, the jet 70 may optionally be angled at approximately 15-20 degrees above or below a substantially horizontal radial plane of the turbine 30. The jet 70 may be fixed within the housing 22.

The fluid 72 may be, for example, a liquid. According to a more particular embodiment, the fluid 72 may be typical drive fluid, such as oil (e.g., engine oil, lube oil, or hydraulic fluid). For example, the fluid 72 may be pressurized engine lube oil. As described further herein, the fluid 72 has a relatively high working-temperature viscosity compared to water. For example, the fluid 72 may have a viscosity between 5-50 centipoise (cP).

Turbine

As shown in FIGS. 7A-10, the single-piece impulse turbine 30 is a rotatable component within the separation assembly 20 that is driven by the fluid 72 in order to rotate the rotor portion 24 within the separation assembly 20. The turbine 30 is configured to rotate or drive the rotor portion 24 such that rotation of the rotor portion 24 is correlated to rotation of the turbine 30. Since the turbine 30 is a single, unitary component within the separation assembly 30, the turbine 30 cannot be separated into further distinct components without damage or destruction occurring to the turbine 30. The force of the incoming fluid 72 from the jet 70 causes the turbine 30 to rotate about the center rotational axis 64 within the separation assembly 20, thereby converting the hydraulic power into mechanical power, as described further herein.

The turbine 30 is hydraulically driven by the fluid 72 from the jet 70 and can be a variety of different types of hydraulic impulse turbines, including but not limited to a Pelton turbine or a Turgo turbine (both of which may or may not be in a modified or variant form). Additionally, the turbine 30 may have single-bucket style or a "split bucket" style.

The turbine 30 is used to convert hydraulic power into mechanical power, where hydraulic power=pressure*flow and mechanical power=torque*speed. Accordingly, as shown in FIGS. 18A-22B, the turbine 30 receives a flow of fluid 72 from the fluid jet 70 at a high velocity. The fluid momentum flux of the fluid 72 is transferred to the turbine 30 as an impulse force, which then rotates the turbine 30 with some associated losses (e.g., losses associated with the conversion of power from hydraulic to rotational). Although a variety of different rotational speeds are possible, the rotational speed is 5,000 to 10,000 revolutions per minute (rpm) in particular embodiments.

The turbine 30 is formed as a single-piece of material and can therefore be molded, cast, or extruded by inexpensive manufacturing processes. Since the turbine 30 is made from a single-piece of material, the turbine 30 does not require any assembly of parts. Accordingly, the turbine 30 can be inexpensively manufactured in order to inexpensively drive and power the separation assembly 20 at a relatively high rotational speed.

In order to allow the turbine 30 to be constructed or formed as a single-piece, the turbine 30 has an "open bottom" or "open end" geometry, which allows the turbine 30 to be straight-pull moldable or extrudable. Accordingly, the turbine 30 does not comprise a "reverse draft" or any undercut geometry features (including any bottom plate) along the second axial end 54 of the turbine 30, which would otherwise necessitate a multi-part turbine assembly (such as a two-part conventional turbine assembly 130 with the split 144 through the middle or a conventional turbine assembly 130 with dozens of parts (i.e., a separate part for each bucket and blade), as shown in FIGS. 1-6).

The undercut geometry feature is any portion or structure that prevents, blocks, or impedes fluid 72 from flowing axially through the bottom 44 of the vanes 32 (through the channels 58) and exiting axially out of the turbine 30 through the second axial end 54. The turbine 30 does not comprise any structures that axially block or impede the axial flow of fluid 72 through the second axial end 54. The undercut geometry feature includes any portion or feature that extends radially and/or tangentially from, for example, the impingement surface 34 and/or the backside 36 of the vanes 32 (in particular from the bottom end 44 of the vanes 32), from the outer surface of the hub 59 of the turbine 30 between the vanes 32 (in particular a bottom area of the hub 59), or from the bottom of the turbine 30 (e.g., along the second axial end 54). The undercut geometry feature may comprise, for example only, a lip, protrusion, extension, wall, or flange. Accordingly, the undercut geometry features block axial fluid flow through the second axial end 54 of the turbine 30. As such, the second axial end 54 is "axially open" in that fluid can flow unblocked axially within the channels 58 between the vanes 32 from a bottom surface of the radially extending structure 53 to the second axial end 54 of the turbine 30 and subsequently through the second axial end 54. The configuration of the turbine 30 still allows the turbine 30 to have good hydraulic efficiency, converting the momentum of the fluid 72 into rotational speed of the turbine 30.

As shown in FIGS. 11A-17C, the overall shape of the turbine 30 is substantially cylindrical. The turbine 30 has a center rotational axis 64 extending through the center and along the length of the turbine 30. The center rotation axis 64 extends in the axial direction. The turbine 30 may optionally define a center hub 59 extending along at least a portion of the length of the turbine 30 and through the center of the turbine 30 (i.e., substantially parallel to and surrounding the center rotational axis 64). At least a portion of the hub 59 may be hollow to provide an area within the turbine 30 to attach with a feature within the separation assembly 20 that connects the turbine 30 to the rotor portion 24 to allow the turbine 30 to cause the rotor portion 24 to rotate. The vanes 32 extend from an outer surface of the hub 59.

The turbine 30 comprises a first axial end 52, a second axial end 54, and a plurality of vanes 32 extending axially relative to the center rotational axis 64 from the first axial end 52 to the second axial end 54. The first axial end 52 of the turbine 30 comprises a closed-off end or top and the other opposite second axial end 54 of the turbine 30 (along the center rotational axis 64) comprises an open end or bottom.

The first axial end 52 of the turbine 30 comprises a radially-extending structure 53 that axially prevents, impedes, or blocks the flow of fluid 72 through the first axial end 52. Accordingly, the fluid 72 cannot flow axially from the channels 58 through the first axial end 52 of the turbine 30. According to one embodiment, the radially-extending structure 53 may comprise a plate or wall that extends radially and tangentially over the spaces defined by the channels 58 along the first axial end 52 of the turbine 30. The vanes 32 may extend from a bottom surface of the radially-extending structure 32 at the first axial end 52 to the second axial end 54. The second axial end 54 does not comprise any structure that axially prevents, impedes, or blocks the flow of the fluid 72 through the second axial end 54. Accordingly, the fluid 72 can flow axially from the channels 58 through the second axial end 54 of the turbine 30.

Figure 12:
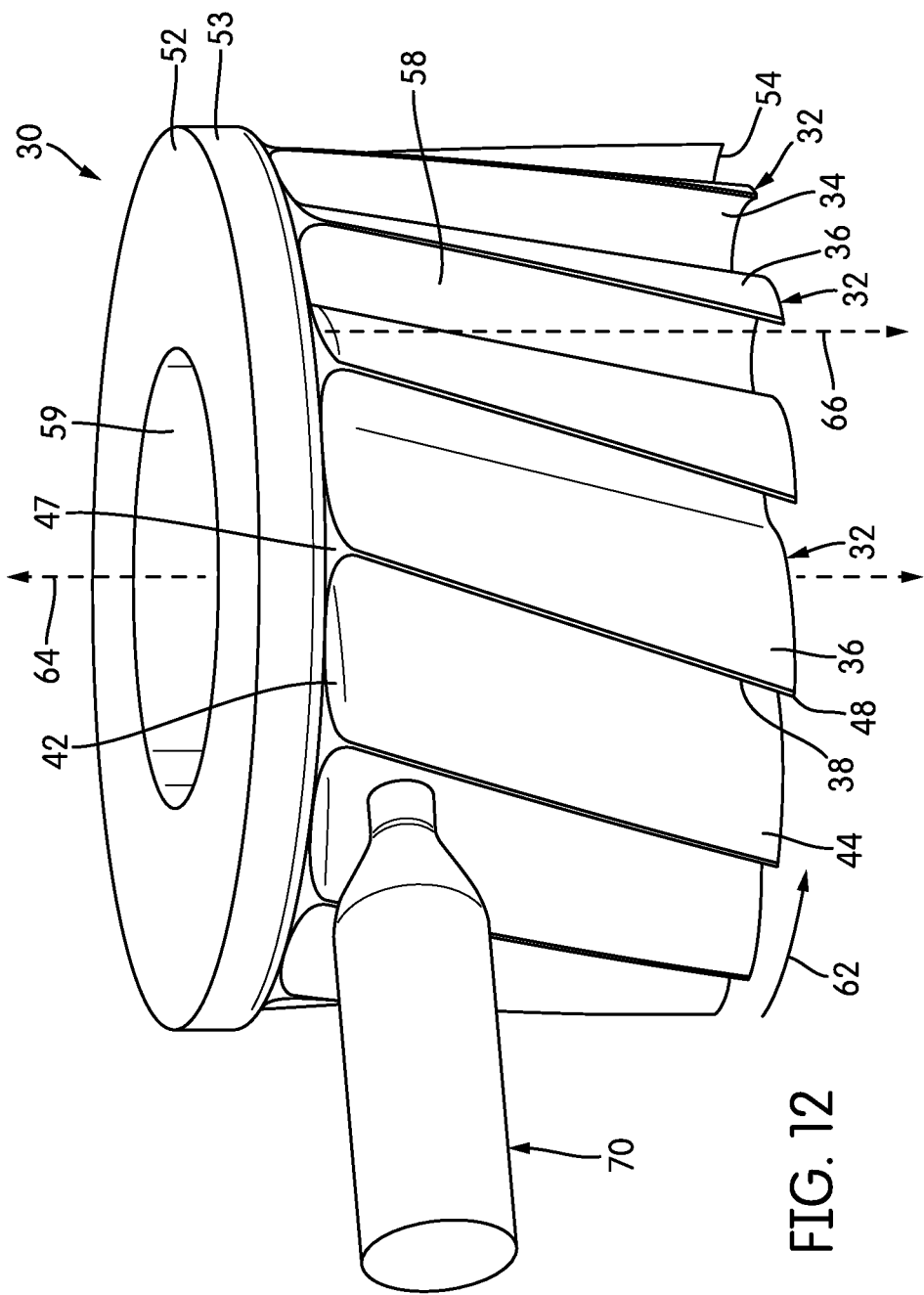
FIG. 12 is a perspective view of a turbine according to another embodiment that can be used within the separation assembly of FIG. 7A.

For example, a potential axial flow line 66 for the fluid 72 where the fluid 72 can flow within one of the channels 58 is shown in FIG. 12. The axial flow line 66 in FIG. 12 is substantially parallel to the center rotational axis 64 and is positioned within one of the channels 58. As shown, the upper end of the axial flow line 66 terminates at the first axial end 52 of the turbine 30 (specifically at the bottom surface of the radially-extending structure 53, along which the vanes 32 extend from). However, the lower end of the axial flow line 66 exits the turbine 30 through the second axial end 54 and can continue beyond the turbine 30. Accordingly, the fluid 72 cannot flow through the first axial end 52 and can flow through the second axial end 54.

Vanes

The turbine 30 also comprises multiple or a plurality of buckets, blades, or vanes 32 that are positioned and shaped to capture the flow of fluid 72 in the radial and tangential directions. Accordingly, the jet 70 directs the fluid 72 toward the vanes 32 in order to rotate the entire turbine 30.

As shown in FIGS. 11A-17C, the vanes 32 provide curvilinear surfaces along the circumference of the turbine 30 in the radial and tangential directions. Since the turbine 30 does not have any undercut geometry features, the vanes 32 extend substantially linearly in the axial direction along at least a portion of the length of the turbine 30 and do not curve or extend outward tangentially or radially along their length in such a manner that would axially block the fluid from flowing axially toward the second axial end 54 of the turbine 30 (as shown in FIG. 11C). Aside from any helical twist the vanes 32 may have, the vanes 32 are substantially parallel to the center rotational axis 64 of the turbine 30. Accordingly, the cross-sectional area (taken along a plane perpendicular to the center rotational axis 64, as shown in FIG. 11C) along the top 42 of the vane 32 proximate the radially-extending structure 53 is approximately equal to or greater than the corresponding cross-sectional area along the bottom 44 of the vane 32 and the second axial end 54 of the turbine 30.

Figure 13:
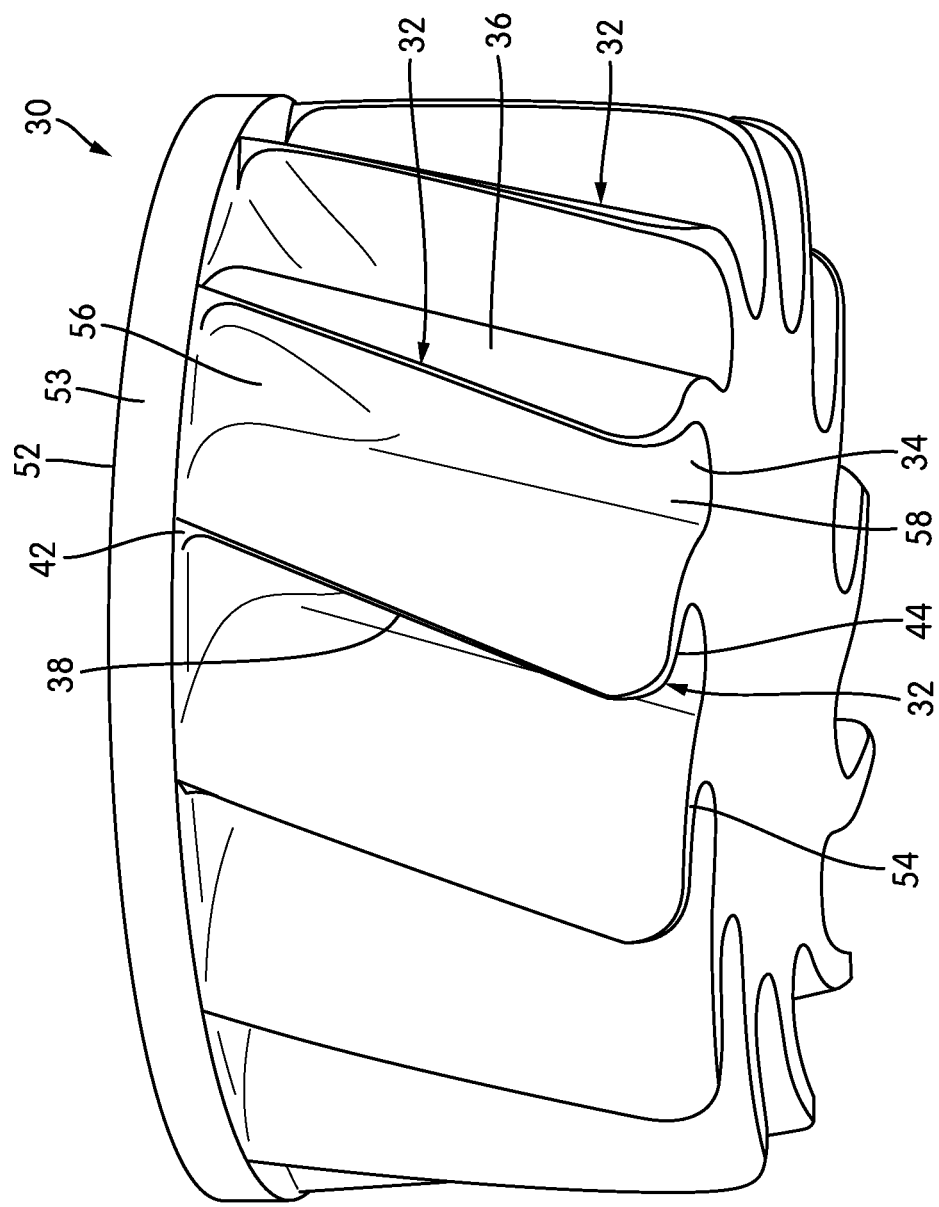
FIG. 13 is a perspective view of a turbine according to yet another embodiment that can be used within the separation assembly of FIG. 7A.

As shown in FIG. 13, the vanes 32 extend axially (e.g., along the direction of the center rotational axis 64) from a bottom surface of the radially-extending structure 53 at the first axial end 52 of the turbine 30 to the second axial end 54 of the turbine 30. The top 42 of the vane 32 refers to the portion of the vane 32 closest to the first axial end 52 and the radially-extending structure 53 of the turbine 30. The bottom 44 of the vane 32 refers to the portion of the vane 32 closest to the second axial end 54 of the turbine 30.

Each of the vanes 32 also extends radially relative to the center rotational axis 64 (and, optionally, from the hub 59) of the turbine 30 and curves about a circumferential portion (e.g., about the center rotation axis 64) of the turbine 30. The vanes 32 are positioned about the entire circumference of the turbine 30. The vanes 32 define axially-extending, longitudinal, u-shaped gaps, spaces, or channels 58 between each of the vanes 32 in order to allow the fluid 72 to flow through the channels 58 between the vanes 32 and to direct the fluid 72 along the turbine 30. The channels 58 extend axially from the first axial end 52 to the second axial end 54.

The count or number of vanes 32 and the relative spacing of the vanes 32 about the circumference of the turbine 30 may vary according to the desired configuration. The number of vanes 32 may affect the hydraulic efficiency of the turbine 30. For example, an inadequate number of vanes 32 (and/or an overspeed operating condition) may cause jet-spill. Jet-spill is the flow of fluid 72 that deflects outward immediately after the fluid 72 hits the vanes 32, as shown in areas 94 of FIGS. 21A and 22B. Jet-spill may prevent some of the momentum of the fluid 72 from being captured and converted into rotation of the turbine 30, which reduces the hydraulic efficiency of the turbine 30.

The vanes 32 each comprise a pressure face or curved impingement surface 34 on a first side of the vane 32 and a back-swept surface, back-face, suction face, or backside 36 on a second side of the vane 32. The impingement surface 34 curves inwardly along the length of the vane 32 (i.e., inwardly along a middle portion of the length of the vane 32), which the backside 36 curves outwardly along a similar curvature along the length of the vane 32 (i.e., outwardly along a middle portion of the length of the vane 32). The impingement surface 34 and the backside 36 converge at the radial outer tip or edge 38 of the vane 32. The outer edge 38 of the vane 32 extends axially from the first axial end 52 to the second axial end 54 of the turbine 32. Additionally, the impingement surface 34 of one vane 32 connects and transitions into the backside 36 of another neighboring vane 32 between each of the vanes 32 and along the outer surface of the hub 59 of the turbine 30.

The geometry of the vanes 32 allows the turbine 30 to be constructed as one single-piece with sufficient hydraulic efficiency performance (approximately 50% hydraulic efficiency). For example, in order to allow the turbine 30 to be constructed or formed as a single-piece, the vanes 32 do not comprise a "reverse draft" or undercut geometry features on the second axial end 54 of the turbine 30 which would otherwise necessitate a multi-part turbine assembly.

Figure 11C:
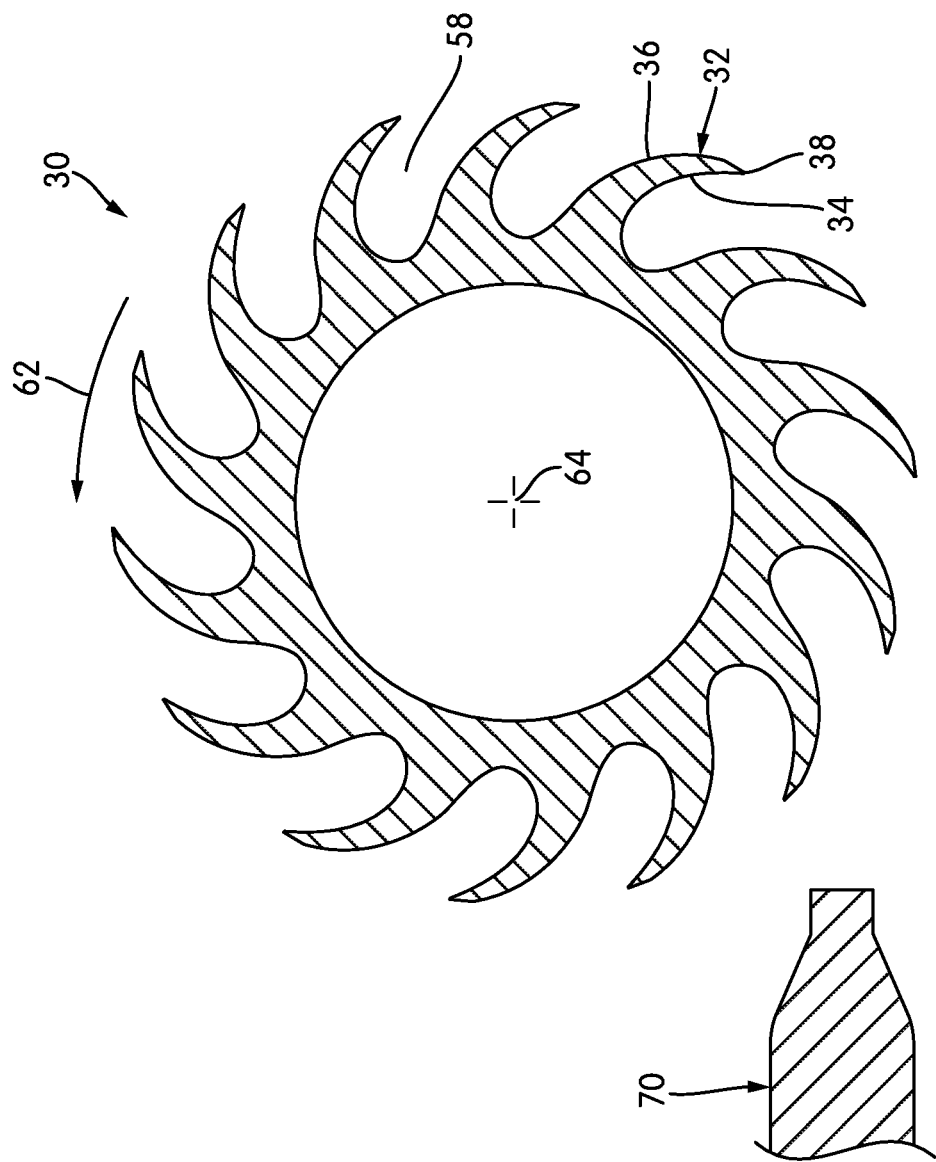
FIG. 11C is a cross-sectional view of the turbine of FIG. 11A.

As shown in FIG. 11C, the vane 32 has a steep back-swept angle (with respect to the rotational direction 62 of the turbine 30). This configuration provides a countering vector of vane angle relative to the tangential velocity of the fluid 72 (where velocity (v)=angular velocity ($\omega$)*radius (r)) at the outer edge 38 of the vane 32. Accordingly, the back-swept angle of the vanes 32 increases the amount of momentum of the fluid 72 that is transferred to the turbine 30 by reducing the residual (discharge) velocity of the fluid 72.

The shape or orientation of the vanes 32 may be changed according to the desired configuration. According to one embodiment as shown in FIGS. 11A-11C, the outer edges 38 of the vanes 32 are substantially parallel to the center rotational axis 64 of the turbine 30 such that the vanes 32 extend axially in a straight manner relative to the center rotational axis 64. Accordingly, as shown in FIG. 11A, the upper portion 47 of the outer edge 38 at the top 42 of a vane 32 is in approximately the same circumferential location along the turbine 30 as the lower portion 48 of the outer edge 38 at the bottom 44 of the vane 32.

According to another embodiment as shown in FIGS. 12-17C, the outer edges 38 of the vanes 32 are angled relative to the center rotational axis 64 of the turbine 30 such that the vanes 32 have a draft angle or a reverse slight helical twist. By "helical twist," it is noted that the outer edge 38 of a respective vane 32 does not axially extend in a substantially perpendicular manner from the first axial end 52. Accordingly, as shown in FIG. 12, the upper portion 47 of the outer edge 38 at the top 42 of a vane 32 is in a different circumferential location or position along the circumference of the turbine 30 as the lower portion 48 of the outer edge 38 at the bottom 44 of the vane 32. The lower portion 48 of the outer edge 38 at the bottom 44 of the vane 32 may be behind the upper portion 47 of the outer edge 38 at the top 42 of the vane 32 along the rotational direction 62 of the turbine 30.

According to one embodiment, the optimal helical twist ratio may range from between approximately 5% to approximately 30%, where the twist ratio is defined as the twist axial pitch/turbine pitch diameter. The twist axial pitch is defined as the axial distance that would be required for a single blade to sweep one full helical turn (i.e., 360°) around the central axis. The turbine 30 may possess, for example, a twist sweep angle of approximately 10-30° relative to the center rotational axis 64. The helical twist in the vanes 32 may be created during the modeling process of the turbine 30 with an unscrewing core or twisted extrusion.

The helical twist may further improve the hydraulic efficiency of transferring the kinetic energy of the fluid 72 to the turbine 30. In one example, the helical twist may increase the hydraulic efficiency by approximately 6%. The reverse helix angle creates some additional resistance to the axial ejection or deflection of the fluid 72, which encourages the momentum of the fluid 72 to be deflected radially along the backside 36 of an adjacent vane 32, instead of toward the second axial end 54 of the turbine 30.

According to one embodiment as shown in FIGS. 11A-13, the backsides 36 of the vanes 32 have a substantially smooth or continuous surface. According to another embodiment as shown in FIGS. 14-15 and 16-17C, the backsides 36 of each of the vanes 32 have a sharp or abrupt drip-release point, slot, cut, step, or edge 46 to improve the performance and increase the hydraulic efficiency of the turbine 30. For example, as shown in the computational fluid dynamics (CFD) volume of fluid (VOF) simulation in FIGS. 21A-21B, the drip-release edge 46 causes the fluid 72 to detach or break away from the backsides 36 of the vanes 32 prior to reaching the outer edges 38 of the vanes 32 (where the velocity at the outer edges 38 of the vanes 32 is relatively higher since the velocity (v)=angular velocity ($\omega$)*radius (r)). As shown in areas 92 in FIGS. 21A-21B, the drip-release edge 46 effectively causes the fluid 72 to detach or release from the backsides 36 of the vanes 32. As shown in areas 96 in FIG. 22B, residual fluid 72 is released around the perimeter of the turbine 30 as the turbine 30 rotates due to the drip-release edge 46. Without the drip-release edge 46, the fluid 72 may stick to the backside 36 of the vane 32 until the outer edge 38 of the vane 32, which allows the fluid 72 to be ejected from the turbine 30 with higher residual velocity, thereby reducing turbine hydraulic efficiency. For maximum efficiency, the fluid 72 would be released from the turbine 30 with zero residual velocity.

Figure 15:
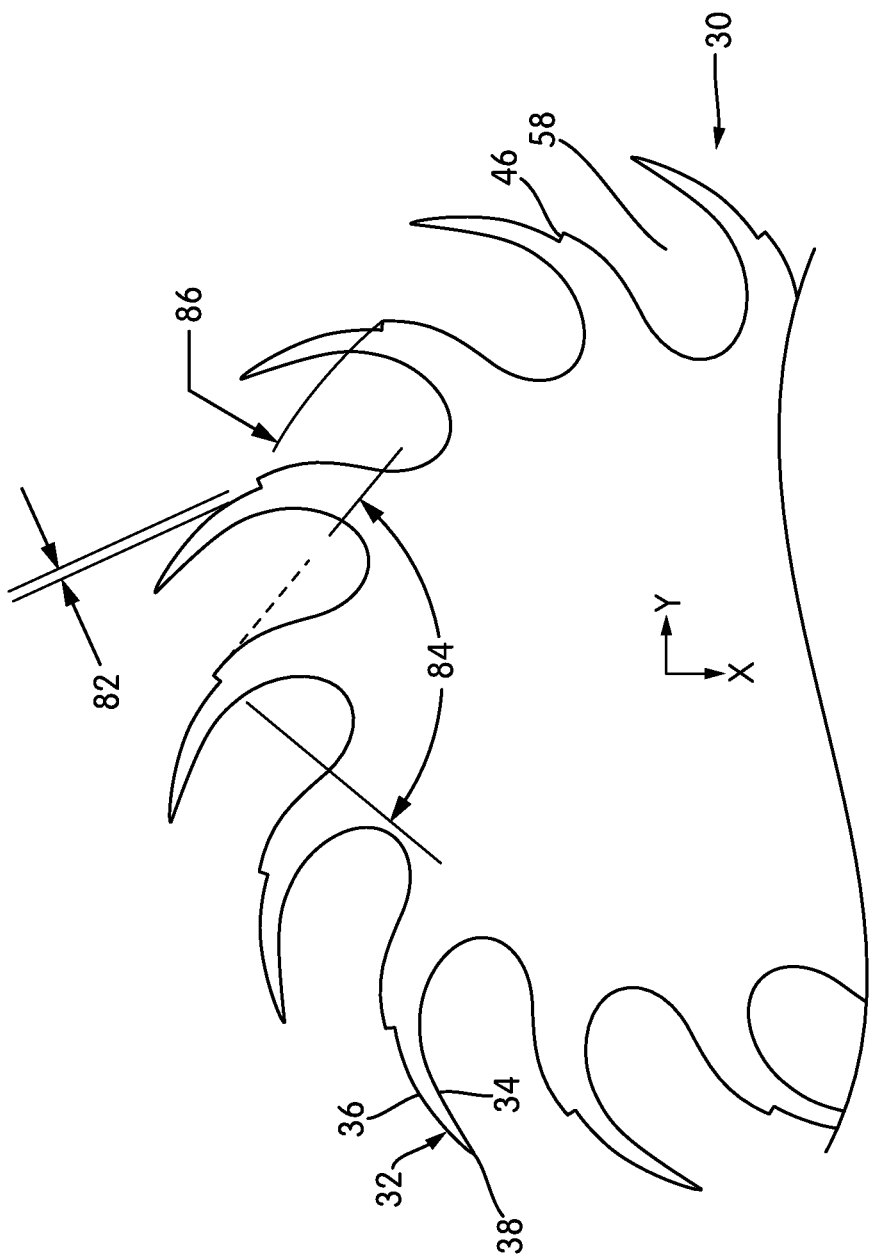
FIG. 15 is a cross-sectional view of a portion of the turbine of FIG. 14.
Figure 16:
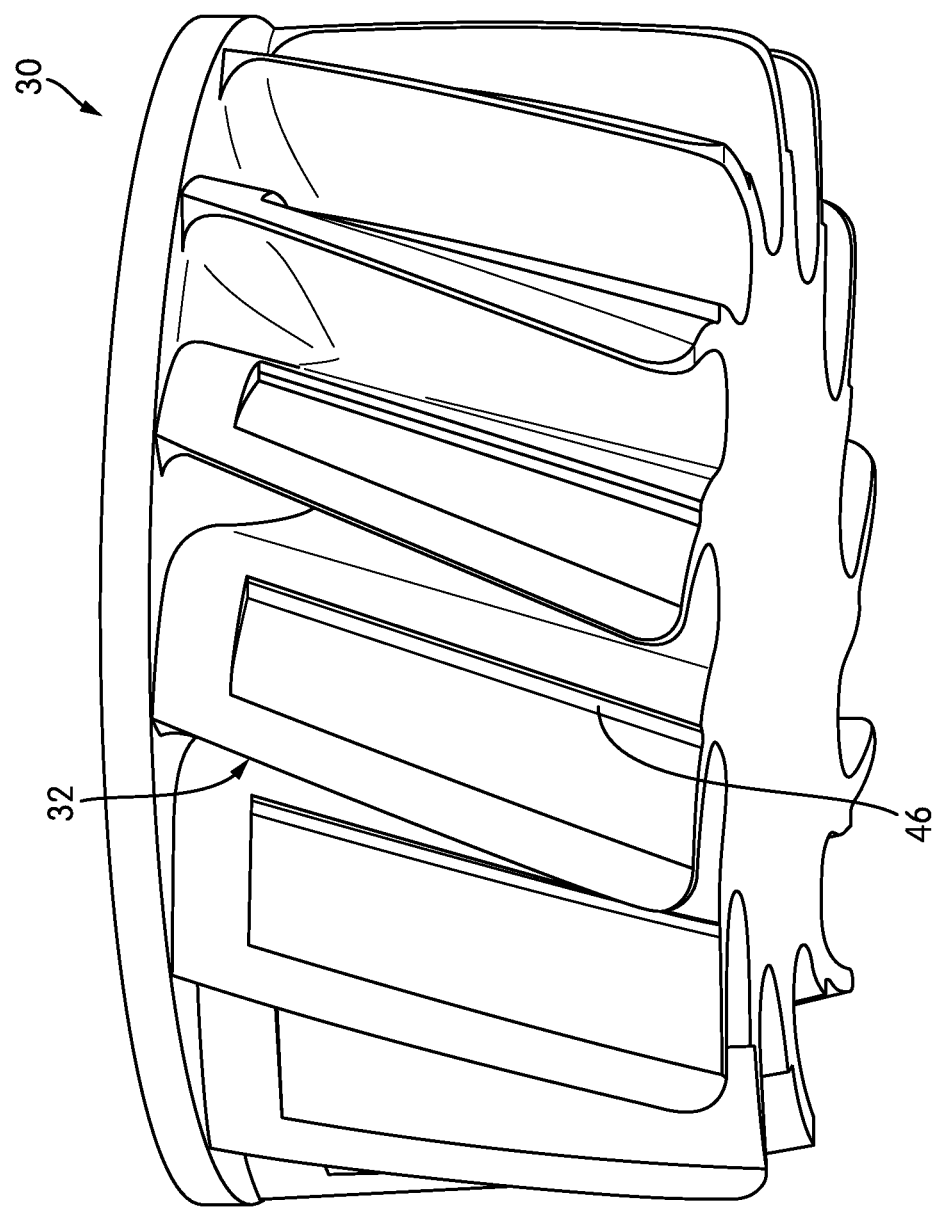
FIG. 16 is a perspective view of a turbine according to another embodiment that can be used within the separation assembly of FIG. 7A.
Figure 18A:
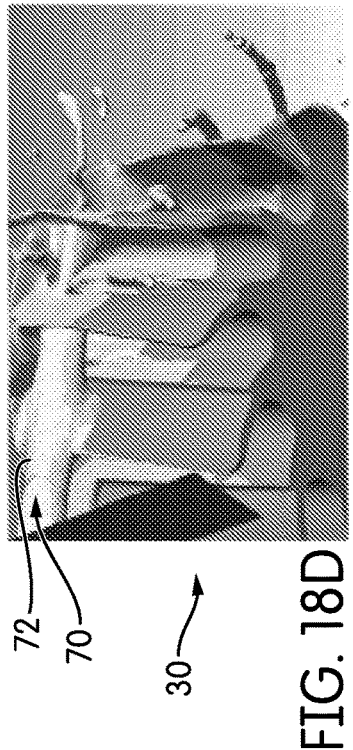
FIGS. 18A-18F are perspective, progressive views of computational fluid dynamics (CFD) modeling showing fluid rotating a turbine according to one embodiment.
Figure 18B:
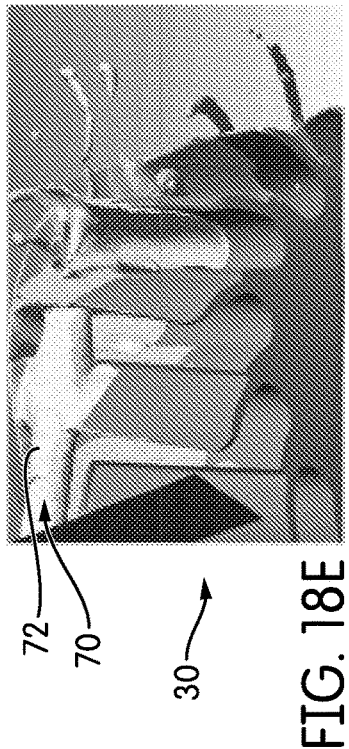
Figure 18C:
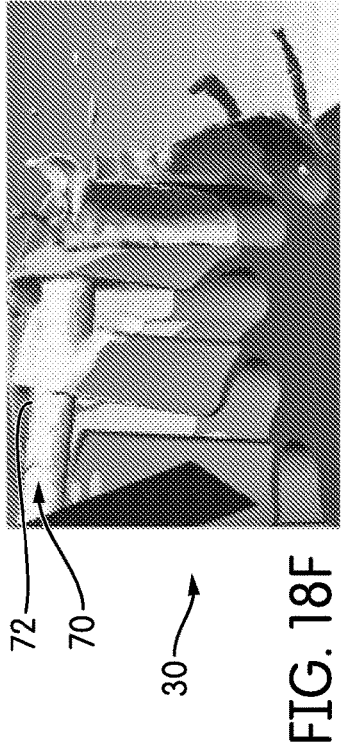
Figure 18D:
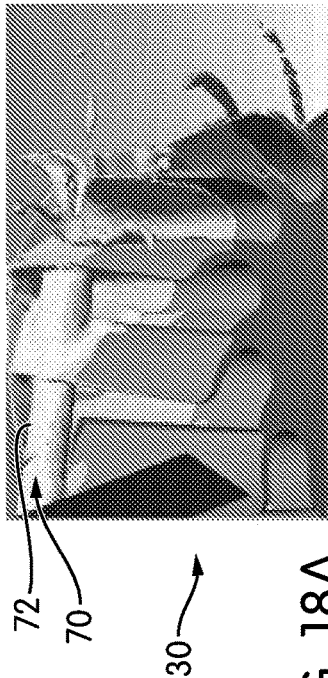
Figure 18E:
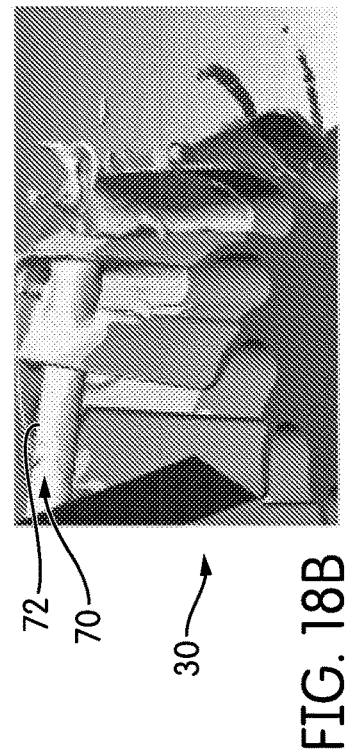
Figure 18F:
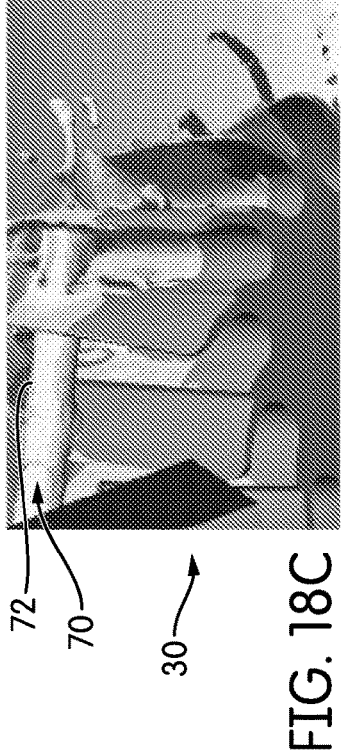

As shown in FIG. 15, the drip-release edge 46 can be defined as an abrupt change in angle 84 along the surface of the backside 36 of the vane 32 or in thickness of the vane 32 (i.e., the distance between the impingement surface 34 and the backside 36 of the vane 32). The outer portion of the vanes 32 may be thicker, thinner, or offset from the inner portion of the vanes 32 such that the drip-release edge 46 extends substantially outward or inward from the surface of the backsides 36 of the vanes 32. As shown in FIG. 15, the drip-release edge 46 may have a variety of different characteristics and dimensions according to the desired configuration. For example, the step height 82, the angle (alpha) 84, and the radial position 86 of the drip-release edge 46 may each be changed according to the desired configuration. According to one embodiment, the drip-release edge 46 is substantially perpendicular to the surface of the backside 36, which creates a stair-step configuration along the surface of the backside 36 of the vane 32. According to one embodiment, the step height 82 may be approximately ¼ to ½ of the total thickness of the vane 32 at the step position. The angle 84 may be more than approximately 10° and may preferably be approximately 90°. The radial position 86 may be at about one half the radial dimension of the vane 32.

The drip-release edge 46 is at least partially radially spaced from the outer edge 38 of the vane 32. The drip-release edge 46 extends along at least a portion of the length of the vane 32. According to one embodiment as shown in FIG. 14, the drip-release edge 46 axially terminates at an area underneath where the jet 70 is expelling the fluid 72 onto the turbine 30 before reaching the jet inlet zone 43 of the vane 32. For example, as shown in FIG. 14, the drip-release edge 46 extends axially substantially parallel to the outer edge 38 of the vane 32 from the bottom 44 (e.g., the bottom edge) of the vane 32 to just underneath the jet inlet zone 43 in a linear manner. Just underneath the jet inlet zone 43 where the drip-release edge 46 axially terminates, the drip-release edge 46 extends toward the outer edge 38 of the vane 32 along a direction substantially parallel to the bottom edge of the vane 32, such that the top of the drip-release edge 46 is substantially parallel to the bottom edge of the vane 32.

According to one embodiment, the performance of the turbine 30 with the drip-release edge 46 (compared to a turbine 30 with the same design except without the drip-release edge 46) was improved by approximately 11%, as determined by computational fluid dynamics (CFD) modeling. More specifically, the efficiency of the turbine 30 with the drip-release edge 46 was 50.4% and the efficiency of the turbine 30 without the drip-release edge 46 was 45.2%.

According to another embodiment of a turbine 30 with a slight change in helix geometry and vane count, adding the drip-release edge 46 to the turbine 30 increased the efficiency by 6%. More specifically, the turbines 30 in FIGS. 13 and 16 each have a helical twist. However, the turbine 30 in FIG. 13 (which does not have a drip-release edge 46) has approximately a 43.3% turbine efficiency and the turbine 30 in FIG. 16 (which has a drip-release edge 46) has approximately a 46% turbine efficiency.

According to CFD modeling, the predicted hydraulic efficiency of one embodiment of a turbine 30 with the drip-release edge 46 exceeded 50% (in which the fluid 72 was lube oil with a viscosity of 12 cP and with a rotational speed of 7,000 rpm, an oil pressure of 2.4 Bar, a 2.8 millimeter (mm) jet 70, a pitch diameter of 32 mm, a surface tension of 20 dyne/cm, and a 20° oil-wall contact angle).

The vanes 32 intersect or directly abut a bottom surface of the radially-extending structure 53 of the turbine 30 at the first axial end 52 of the turbine 30. According to one embodiment as shown in FIG. 13, the radius of the top 42 of the vanes 32 is blended or combined with the radius of the radially-extending structure 53 (i.e., the impingement surface 34 of the vane 32, the backside 36 of the vane 32, and the bottom surface of the radially-extending structure 53 are blended together to create a smooth interface therebetween) such that a blend radius 56 is formed within the channels 58 (e.g., between the impingement surface 34 and the backside 36 of the vane 32) and between the tops 42 of the vanes 32 and the bottom surface of the radially-extending structure 53. The blend radius 56 is positioned within the jet inlet zone 43 such that fluid 72 flowing directly from the jet 70 initially contacts at least a portion of the blend radius 56 of the turbine 30. The blend radius 56 is angled or sloped downward toward the second axial end 54 of the turbine 30 (and inward toward the center rotational axis 64), which causes the fluid 72 to be deflected downward away from the first axial end 52 of the turbine 30 and toward the second axial end 54 of the turbine 30.

The Interaction between the Fluid and the Turbine

The turbine 30 (specifically the vanes 32) is designed to capture the flow and kinetic energy of the fluid 72 in order to transfer as much of the fluid momentum flux of the fluid 72 as possible to the turbine 30 as an impulse force, which rotates the turbine 30. Accordingly, as much of the velocity of the fluid 72 as possible should be transferred into rotational speed of the turbine 30.

By directing the fluid 72 into the vanes 32, the momentum of the fluid 72 is transferred to the turbine 30 and causes the turbine 30 to spin. The turbine 30 harnesses the relatively high viscosity of the fluid 72 (e.g., the oil) to transfer the momentum of the fluid 72 to the vane 32 before the fluid 72 leaves or is ejected from the surface of the turbine 30.

As shown in FIGS. 18A-22B, CFD modeling, simulations, and animations of the turbine 30 show how the fluid 72 interacts with the turbine 30. As shown, the fluid 72 from the jet 70 enters into the turbine 30 and is "sliced" by the outer edge 38 of the vanes 32 and enters into the channels 58 between the vanes 32 and the jet inlet zone 43. As the fluid 72 contacts the vanes 32, the fluid 72 "slows down" as the fluid 72 flows along the impingement surface 34 of the vane 32 and transfers kinetic energy to the turbine 30. The momentum of the fluid 72 causes the fluid 72 to move into the channels 58 and initially hit the blend radius 56, which causes or directs the fluid 72 to be initially deflected downward axially along the channels 58 (toward the second axial end 54 of the turbine 30). The fluid 72 then flows radially outward from the inner radius at the intersection or root between the impingement surface 34 of one vane 32 and the backside 36 of another vane 32.

The fluid 72 is then ejected or discharged from the turbine 30. Some of the fluid 72 is discharged radially outwardly off of the backsides 36 of the vanes 32, and some of the fluid 72 is discharged axially from the second axial end 54 of the turbine 30. However, the majority of the fluid 72 is ejected radially from the sides of the vanes 32, rather than axially from the second axial end 54 of the turbine 30.

As shown in FIGS. 18A-22B, the fluid 72 enters into the turbine 30 at a high velocity (shown in a lighter shade) and exits the turbine 30 at a lower velocity (shown in a darker shade) since the fluid momentum flux of the fluid 72 is translated into an impulse force on the turbine 30 in order to rotate the turbine 30. Some of the fluid 72 may have residual velocity (where velocity (v)=angular velocity (ω)*radius (r)) at the outer edge 38 of the vane 32. A portion of the fluid 72 may exit the second axial end 54 of the turbine 30.

According to one embodiment, the fluid 72 may enter into the turbine 30 at a speed of approximately 18 meters per second (m/s) and exit the turbine 30 at a speed of approximately 10 m/s or less. Since kinetic energy=½*mass*velocity$^2$, approximately 70% of the kinetic energy of the fluid 72 is captured (although the CFD modeling, as described further herein, provides a more precise calculation of the efficiency of the turbine 30).

In order to maximize how much of the energy of the fluid 72 is transferred to the turbine 30, the axial length or height of the turbine 30 may be relatively "long." The turbine 30 is sufficiently long such that the majority of the fluid 72 flows down a portion of the turbine 30 but is radially expelled off of the turbine 30 before reaching the second axial end 54 of the turbine 30 and axially exiting the turbine 30. The relatively large axial length of the turbine 30 provides a larger area for the fluid 72 (with a velocity from the jet 70) to slow down along the impingement surface 34 of the vane 32 due to viscous drag and increases the likelihood that the fluid 72 will be ejected radially outwardly from the vanes 32 prior to reaching the second axial end 54 of the turbine 30. Since the back-swept angle of the backside 36 of the vanes 32 allows more of the momentum of the fluid 72 to transferred to the turbine 30, it is particularly beneficial to eject the fluid 72 radially off of the vanes 32 (instead of axially from the second axial end 54 of the turbine 30).

According to one embodiment, the axial length of the turbine 30 (taken along a line parallel to the center rotational axis 64) is more than approximately two or three times the inner diameter of the jet 70 (through which the fluid 72 flows). According to another embodiment, the axial length of the turbine 30 is more than approximately five times the diameter of the jet 70. If the axial length of the turbine 30 is too short (e.g., less than approximately three times the diameter of the jet 70), a substantial amount of fluid 72 with a high residual axial velocity (i.e., uncaptured momentum energy) may axially "shoot through" the second axial end 54 of the turbine 30 (through the axial channels 58 between vanes 32), which lowers the amount of energy transferred from the fluid 72 to the turbine 30, thus decreasing the hydraulic efficiency.

Turbine Efficiency

The impulse turbine 30 and the conventional impulse turbine assembly 130 are relatively small and the fluid 72, 172 used with the turbine 30 and the conventional turbine assembly 130, respectively, has a relatively high liquid viscosity. Comparatively, hydroelectric turbines, such as "picohydro" turbines, are usually many times larger in size than the turbine 30 and the conventional turbine assembly 130. Furthermore, hydroelectric turbines use water instead of oil to drive the turbine 30. The viscosity of water is less than $\frac{1}{10}^{th}$ the viscosity of the fluid 72, 172 (e.g., engine oil) that is used with the turbine 30 and the conventional turbine assembly 130, respectively. For example, the viscosity of water is approximately 1 cP and the viscosity of the fluid 72, 172 (e.g., the oil) may be approximately 10-20 cP. Accordingly, the efficiency of the turbine 30 and the efficiency of the conventional turbine assembly 130 are substantially lower than the efficiency of larger scale turbines used with water in hydroelectric power applications.

The "scale effect" can be characterized by the Reynolds number of the turbines by the below equation:

$$Re = \frac{\rho v D}{\mu}$$

where Re is the Reynolds number, rho (ρ) is the density of the fluid, v is the mean velocity of the fluid, D is the diameter, and μ is the viscosity of the fluid.

The Reynolds number of the turbine 30 and of the conventional turbine assembly 130 is relatively constrained relative to the Reynolds number of hydroelectric turbines due to a number of different factors, in particular how viscous, wetting, and "sticky" the fluid 72, 172 is. For example, the Reynolds number of the turbine 30 and of the conventional turbine assembly 130 is typically at least two to three orders of magnitude smaller than the Reynolds number of hydroelectric turbines. Therefore, the turbine 30 and conventional turbine assemblies 130 are less efficient than hydroelectric turbines. Typically, the hydraulic efficiency of hydroelectric turbines (even small hydroelectric turbines) ranges between approximately 70-90%. The efficiency of conventional turbine assemblies 130 ranges between approximately 30-65% (more specifically, approximately 57%), depending on design details and care taken to avoid jet-bucket interference, jet spill, and other design-related problems.

Figure 19A:
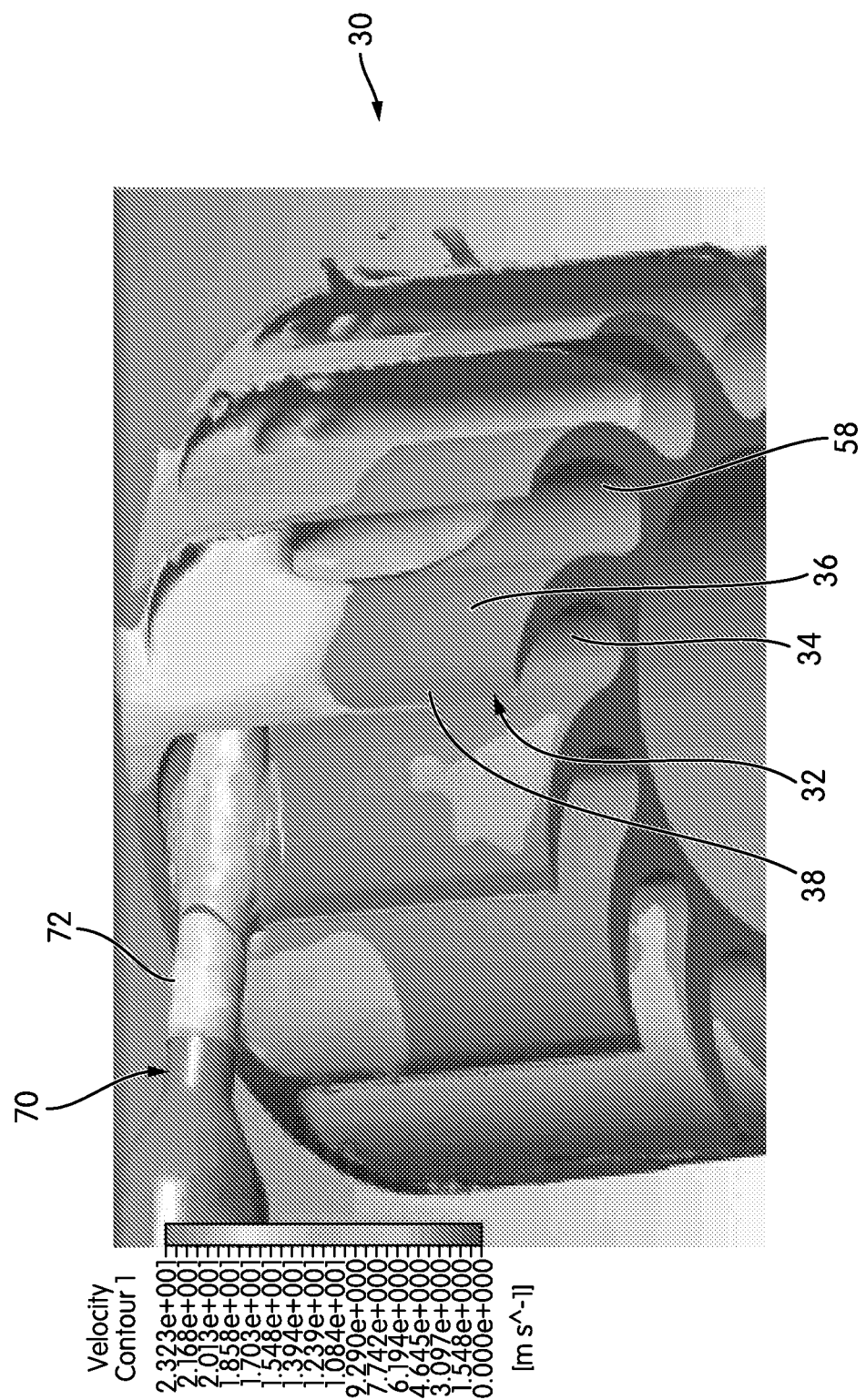
FIG. 19A is a perspective view of CFD modeling showing fluid rotating a turbine according to another embodiment.
Figure 19B:
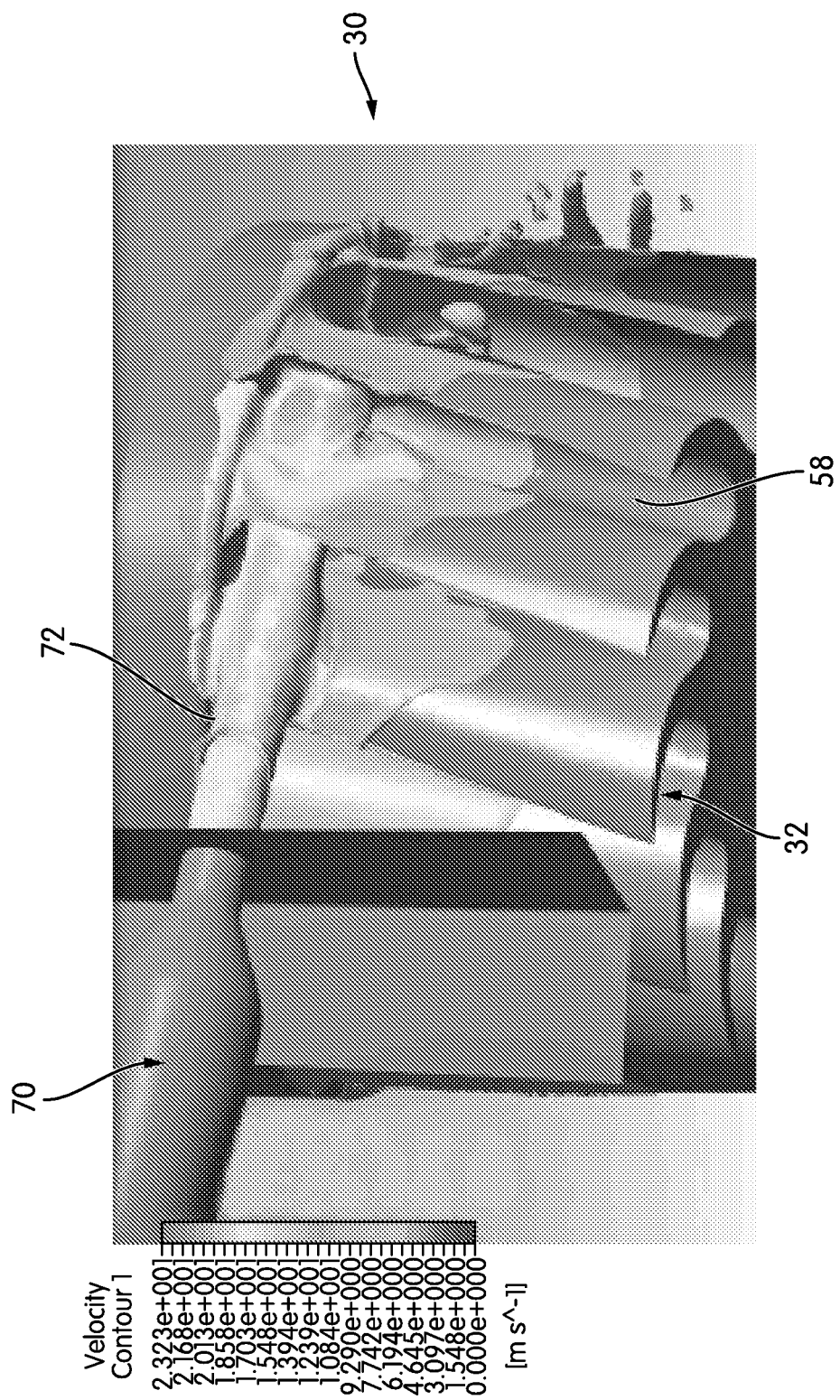
FIG. 19B is a perspective view of the turbine of FIG. 19A at a different rotation.
Figure 19C:
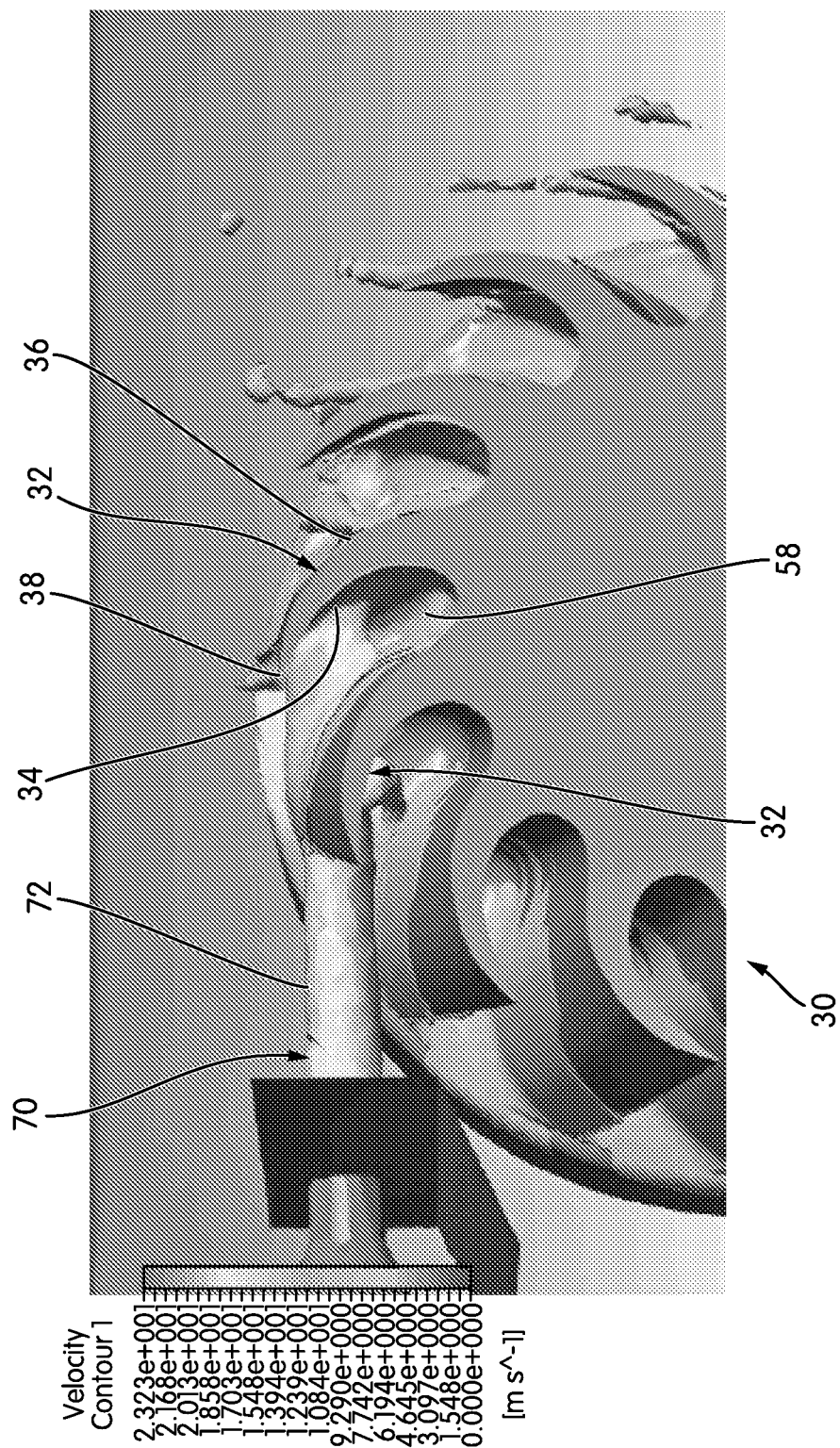
FIG. 19C is a bottom perspective view of the turbine of FIG. 19A at a different rotation.
Figure 20A:
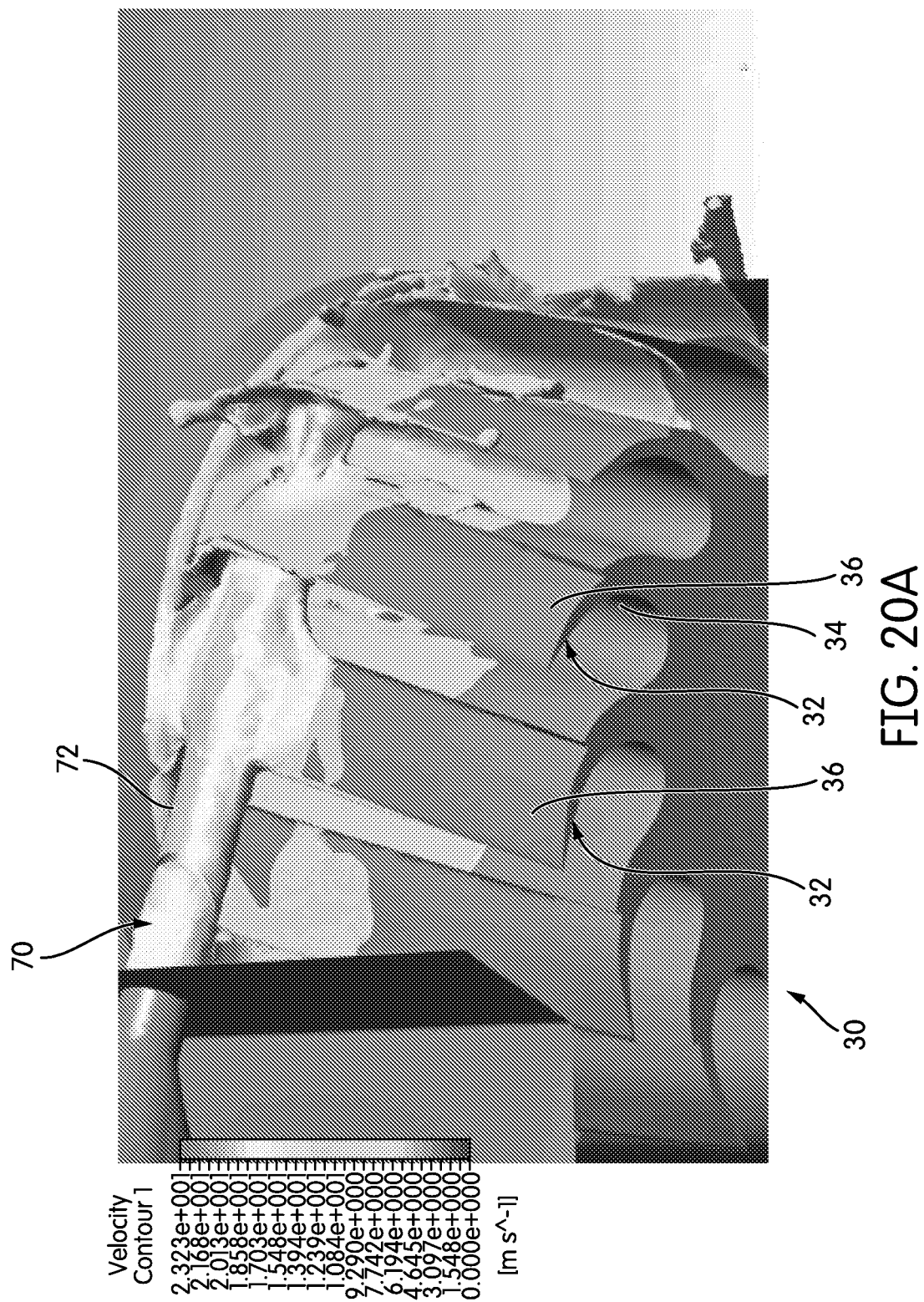
FIG. 20A is a perspective view of CFD modeling showing fluid rotating a turbine according to yet another embodiment.
Figure 20B:
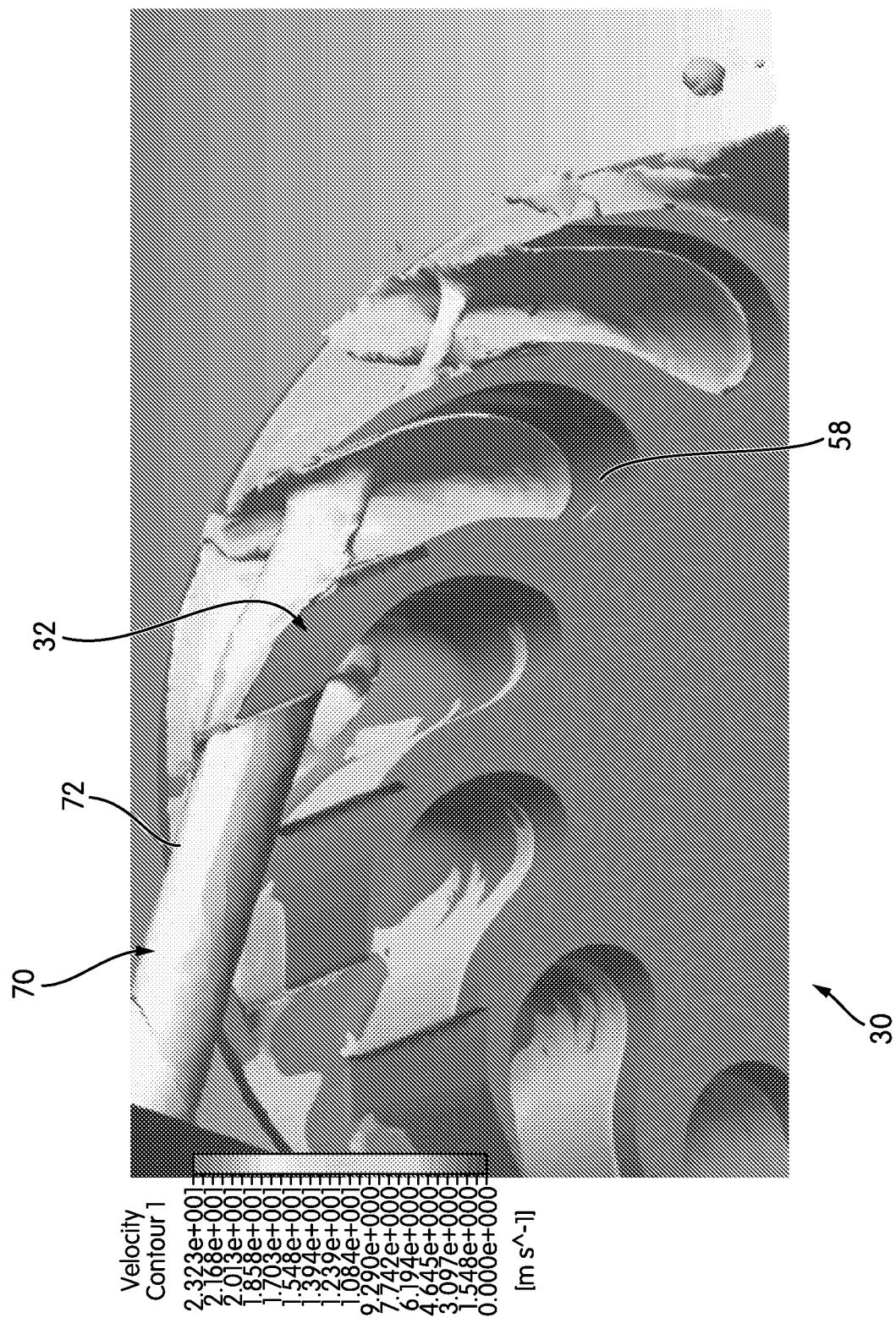
FIG. 20B is a bottom perspective view of the turbine of FIG. 20A at a different rotation.
Figure 21A:
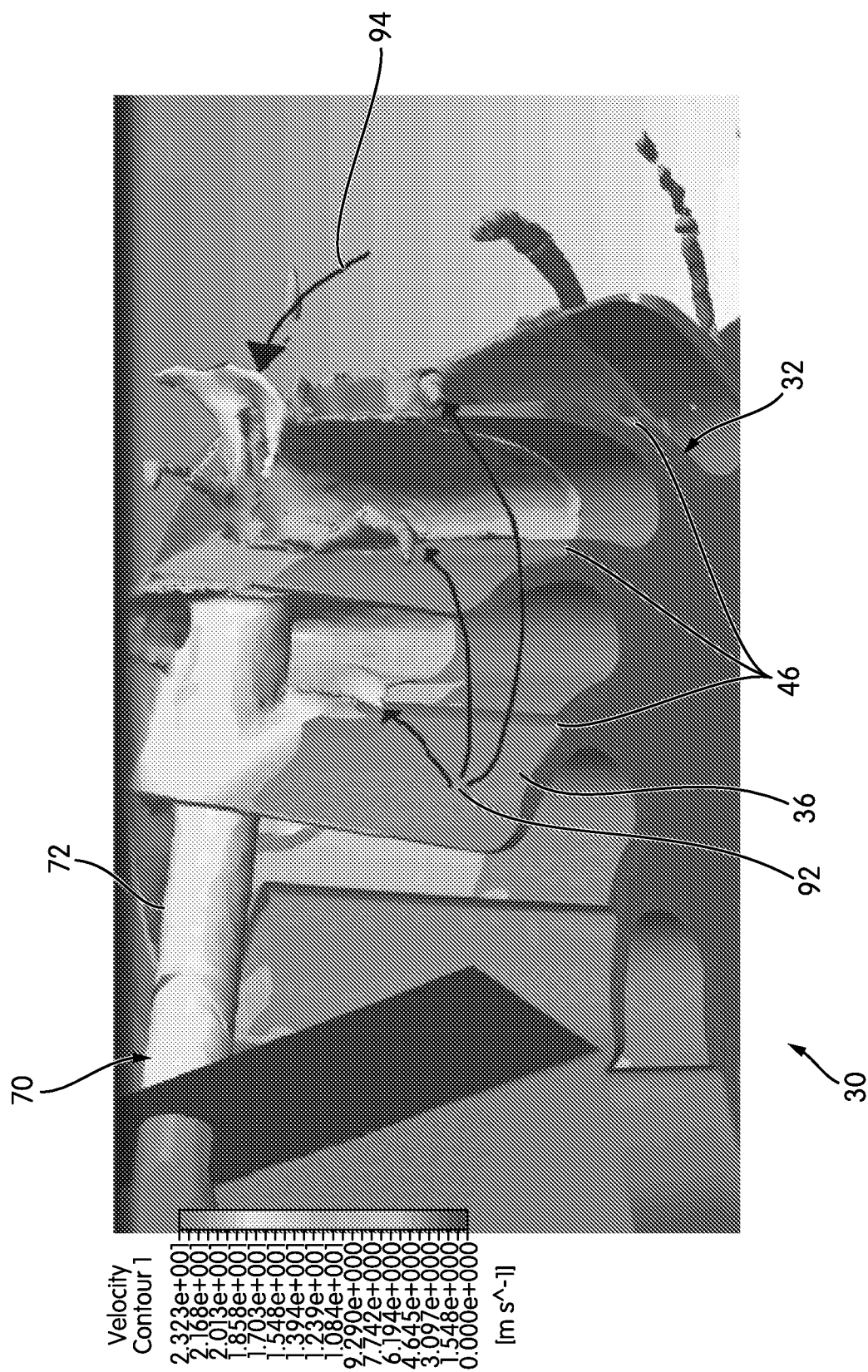
FIG. 21A is a perspective view of CFD modeling showing fluid rotating a turbine according to still another embodiment.
Figure 21B:
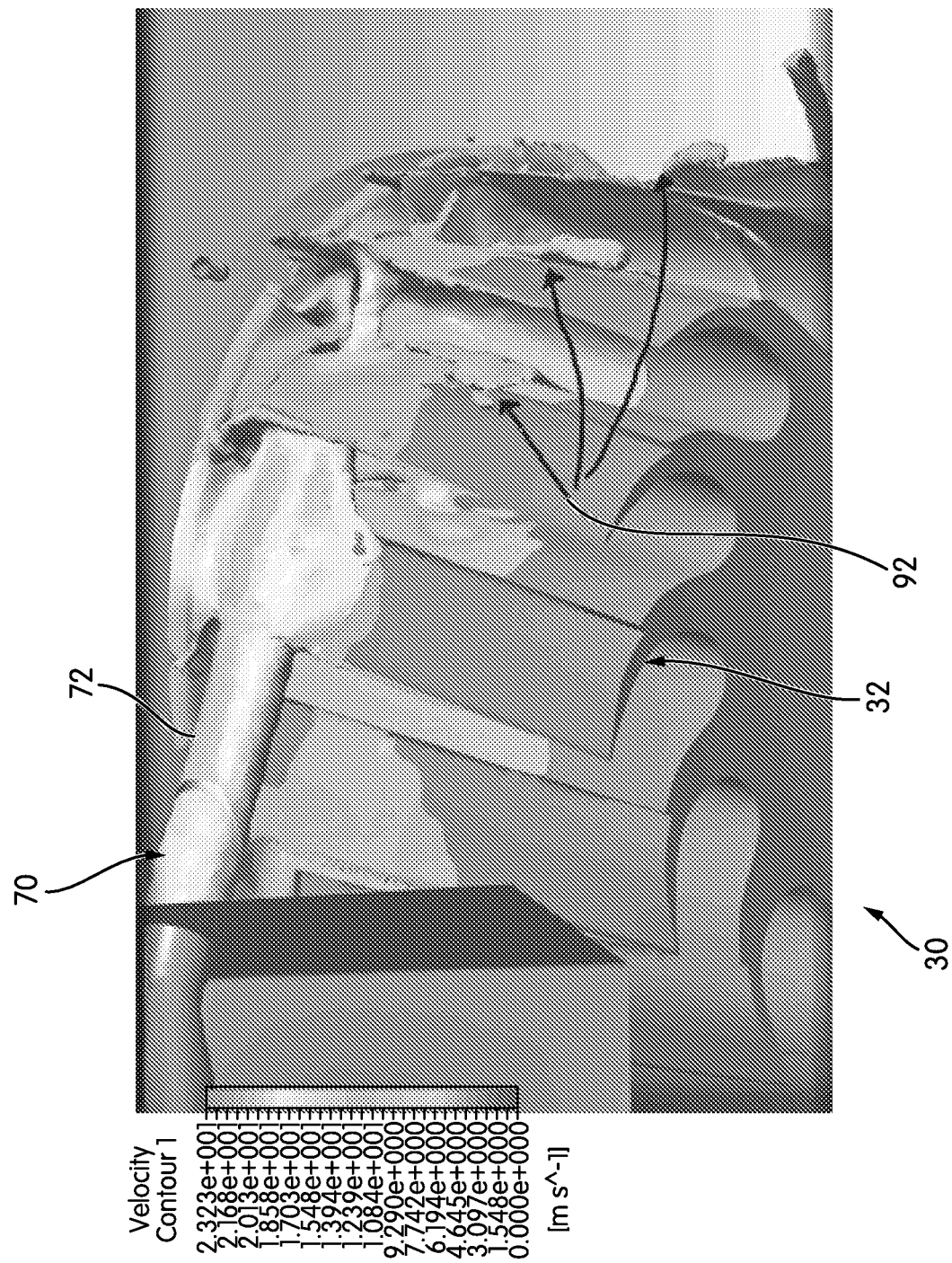
FIG. 21B is a perspective view of the turbine of FIG. 21A at a different rotation.
Figure 22A:
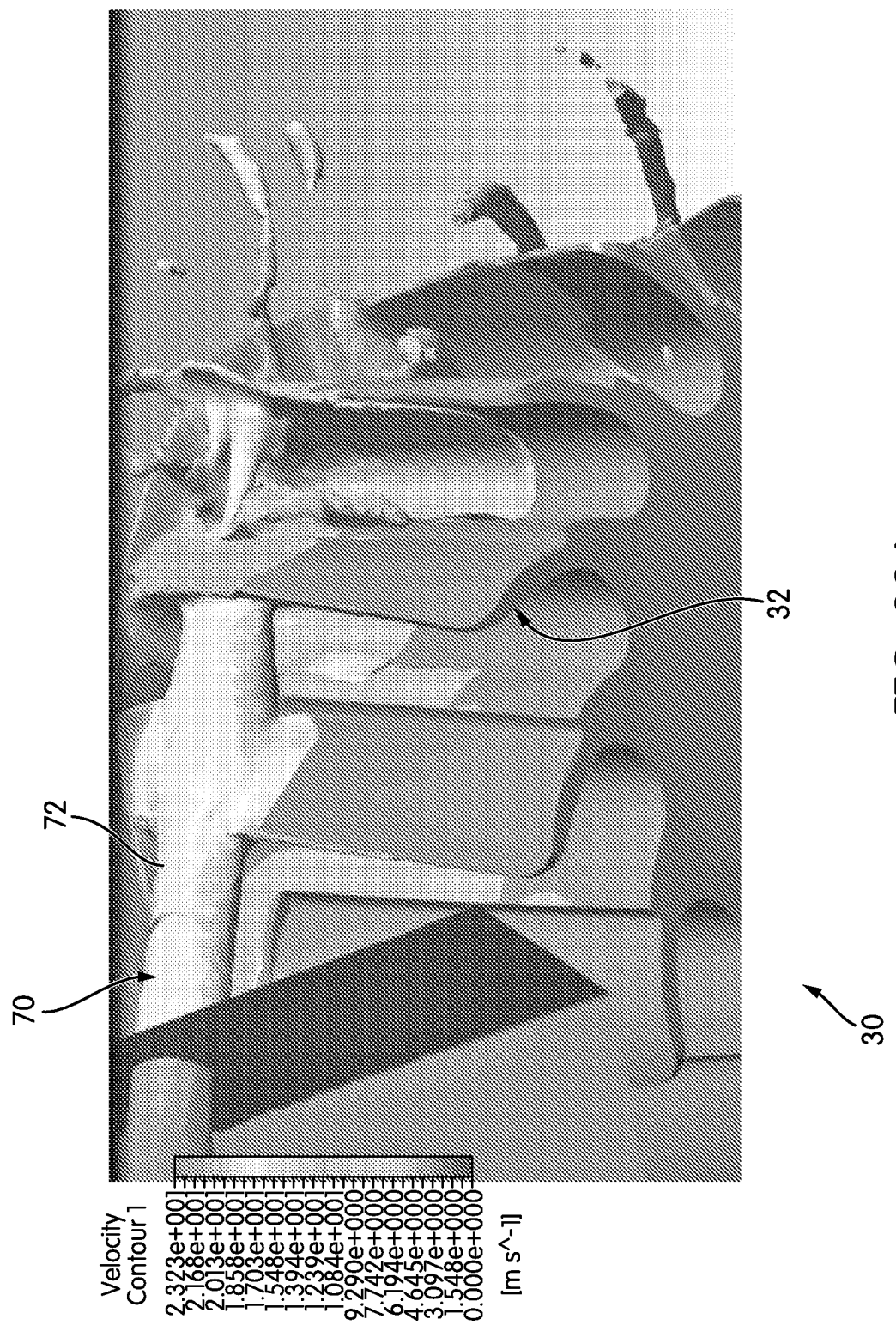
FIG. 22A is a perspective view of CFD modeling showing fluid rotating a turbine according to another embodiment.
Figure 22B:
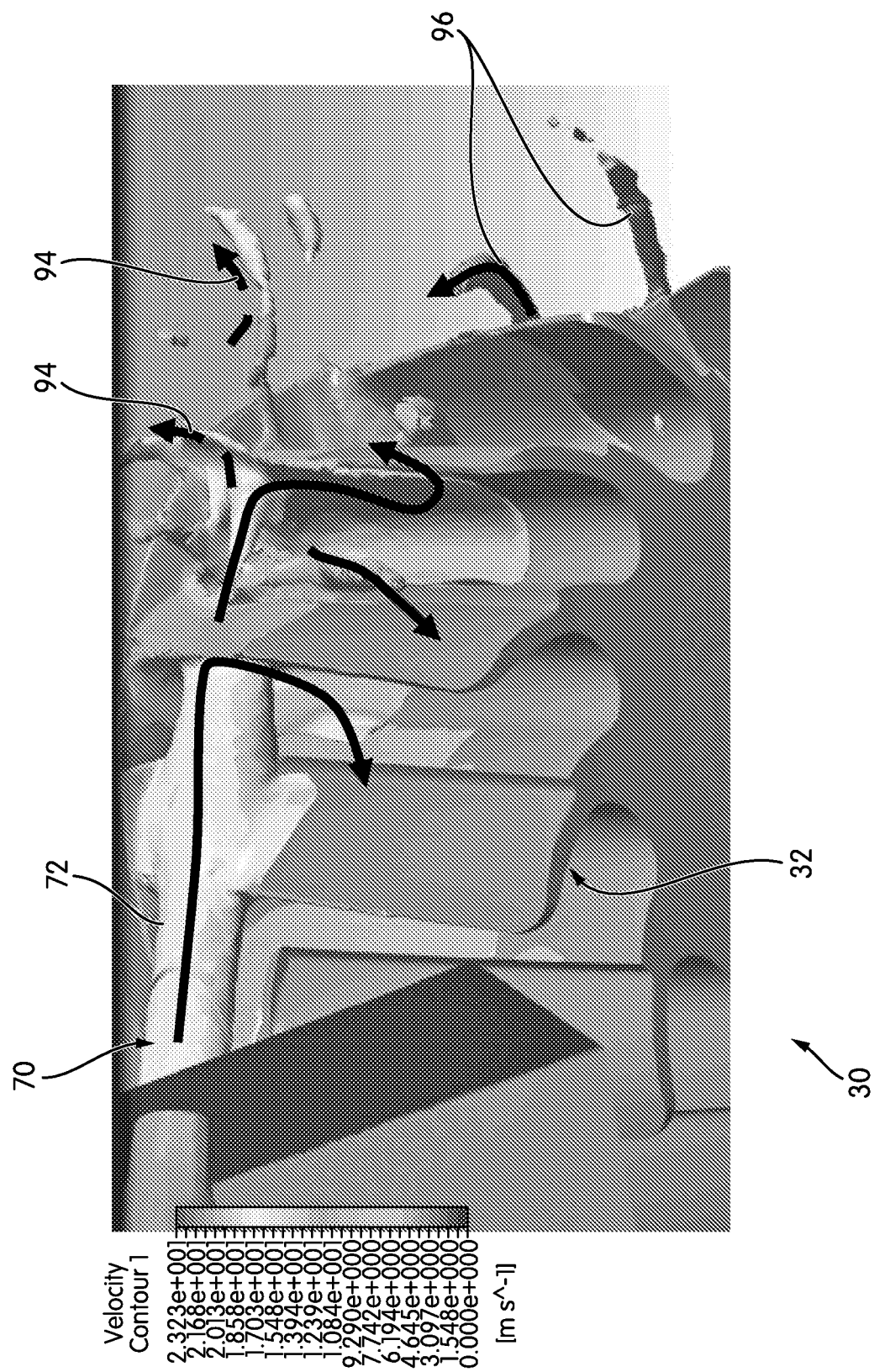
FIG. 22B is a perspective view of the turbine of FIG. 22A showing the flow path of the fluid.

According to one embodiment as shown in FIG. 19A, the efficiency of the turbine 30 may be approximately 42%. According to another embodiment, the efficiency of the turbine 30 may be approximately 45.2%. As described further herein, the efficiency of the turbine 30 may be above 50%, depending on the particular configuration of the turbine 30.

As utilized herein, the terms "about," "approximately," "substantially," and similar terms are intended to have a broad meaning in harmony with the common and accepted usage by those of ordinary skill in the art to which the subject matter of this disclosure pertains. The term "approximately" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A separation assembly comprising:
   a housing;
   a jet that expels a fluid within the housing;
   a turbine positioned within the housing and positioned so as to be contacted by the fluid expelled from the jet, the fluid causing the turbine to rotate about a center rotational axis within the housing,
   the turbine comprising a first axial end, a second axial end, and a plurality of vanes extending axially relative to the center rotational axis from the first axial end to the second axial end, the plurality of vanes defining axially-extending channels between each of the plurality of vanes,
   the first axial end comprising a radially-extending structure that axially blocks the flow of the fluid through the first axial end, the second axial end being axially open such that fluid can flow unblocked axially through the second axial end,
   the fluid flowing unblocked axially within the channels between the plurality of vanes from a bottom surface of the radially extending structure to the second axial end of the turbine.

2. The separation assembly of claim 1, wherein the turbine is formed as a single piece.

3. The separation assembly of claim 1, wherein outer edges of the plurality of vanes extend axially in a substantially parallel manner relative to the center rotational axis.

4. The separation assembly of claim 1, wherein outer edges of the plurality of vanes extend axially at a twist angle relative to the center rotational axis such that the plurality of vanes have a helical twist.

5. The separation assembly of claim 4, where an upper portion of the outer edge is in a different circumferential position along the circumference of the turbine than a lower portion of the outer edge.

6. The separation assembly of claim 1, wherein the plurality of vanes each comprise an impingement surface on a first side thereof and a backside on a second side thereof, the backside having a substantially continuous surface.

7. The separation assembly of claim 1, wherein the plurality of vanes each have an impingement surface on a first side thereof and a backside on a second side thereof, wherein the impingement surface and the backside converge at an outer edge of the respective vane.

8. The separation assembly of claim 7, wherein the backside of each of the plurality of vanes comprises a drip-release edge that is at least partially radially spaced from the outer edge of the respective vane.

9. The separation assembly of claim 8, wherein the drip-release edge extends substantially parallel to the outer edge of the respective vane.

10. The separation assembly of claim 8, wherein the drip-release edge extends axially in a linear manner from a bottom edge of the respective vane and axially terminates at an area underneath where the jet is expelling the fluid onto the turbine.

11. The separation assembly of claim 10, wherein, along the area underneath where the jet is expelling the fluid onto the turbine and here the drip-release edge axially terminates, the drip-release edge extends toward the outer edge of the vane along a direction substantially parallel to the bottom edge of the vane.

12. The separation assembly of claim 1, wherein the radially-extending structure comprises a plate that extends over spaces defined by the axially-extending channels.

13. The separation assembly of claim 1, wherein the jet is positioned toward the first axial end of the turbine such that the jet directs fluid directly beneath the radially extending structure.

14. The separation assembly of claim 1, wherein the turbine is configured to rotate a rotor portion within the separation assembly.

15. The separation assembly of claim 1, wherein the turbine does not comprise any undercut geometry features that extend radially and/or tangentially from the plurality of vanes, an outer surface of a center hub of the turbine between the vanes, or a bottom of the second axial end of the turbine and that block axial fluid flow through the second axial end of the turbine.

16. The separation assembly of claim 1, wherein the plurality of vanes extend linearly in the axial direction and do not extend outward tangentially or radially along the length of the plurality of vanes in such a manner that would axially block fluid from axially flowing from the first axial end to the second axial end of the turbine.

17. The separation assembly of claim 1, wherein a cross-sectional area taken along a plane perpendicular to the center rotational axis along a top portion of each respective vane proximate the radially-extending structure is approximately equal to or greater than a corresponding cross-sectional area along a bottom portion of the respective vane.

18. A turbine for a separation assembly and positioned to be contacted by fluid expelled by a jet, the turbine comprising:
   a first axial end comprising a radially-extending structure that axially blocks the flow of the fluid through the first axial end;
   a second axial end being axially open such that the fluid can flow unblocked axially through the second axial end; and
   a plurality of vanes extending axially relative to a center rotational axis from the first axial end to the second axial end, the plurality of vanes defining axially-extending channels between each of the plurality of vanes,
   the fluid flowing, unblocked axially within the channels between the plurality of vanes from a bottom surface of the radially extending structure to the second axial end of the turbine,
   the fluid causing the turbine to rotate about the center rotational axis.

19. The turbine of claim 18, wherein the turbine is positioned within a housing of the separation assembly, wherein the jet expels the fluid within the housing.

20. The turbine of claim 18, wherein the turbine is formed as a single piece.

21. The turbine of claim 18, wherein the radially-extending structure comprises a plate that extends over spaces defined by the axially-extending channels.

22. The turbine of claim 18, wherein the turbine does not comprise any undercut geometry features that extend radially and/or tangentially from the plurality of vanes, an outer surface of a center hub of the turbine between the plurality of vanes, or a bottom of the second axial end of the turbine and that block axial fluid flow through the second axial end of the turbine.

23. A method of making a turbine for a separation assembly, the method comprising:
   forming the turbine as a single-piece of material such that the turbine does not require any assembly of parts, the turbine comprising
      a first axial end comprising a radially-extending structure that axially blocks a flow of a fluid from a jet through the first axial end;
      a second axial end being axially open such that the fluid can flow unblocked axially through the second axial end; and
      a plurality of vanes extending axially relative to a center rotational axis from the first axial end to the second axial end, the plurality of vanes defining axially-extending channels between each of the plurality of vanes, the field flowing unblocked axially within the channels between the plurality of vanes from a bottom surface of the radially extending structure to the second axial end of the turbine, the fluid causing the turbine to rotate about the center rotational axis.

24. The method of claim 23, wherein forming the turbine comprises at least one of molding, casting, or extruding the turbine.

25. A separation assembly comprising:
   a housing;
   a jet that expels a fluid within the housing;
   a turbine positioned within the housing and positioned so as to be contacted by the fluid expelled from the jet, the fluid causing the turbine to rotate about a center rotational axis within the housing,
   the turbine comprising a first axial end, a second axial end, and a plurality of vanes extending axially relative to the center rotational axis from the first axial end to the second axial end, the plurality of vanes defining axially-extending channels between each of the plurality of vanes,
   the first axial end comprising a radially-extending structure that axially blocks the flow of the fluid through the first axial end, the second axial end being axially open such that fluid can flow unblocked axially through the second axial end, wherein outer edges of the plurality of vanes extend axially in a substantially parallel manner relative to the center rotational axis.

26. A separation assembly comprising:
   a housing;
   a jet that expels a fluid within the housing;
   a turbine positioned within the housing and positioned so as to be contacted by the fluid expelled from the jet, the fluid causing the turbine to rotate about a center rotational axis within the housing,
   the turbine comprising a first axial end, a second axial end, and a plurality of vanes extending axially relative to the center rotational axis from the first axial end to the second axial end, the plurality of vanes defining axially-extending channels between each of the plurality of vanes,
   wherein the plurality of vanes each have an impingement surface on a first side thereof and a backside on a second side thereof, wherein the impingement surface and the backside converge at an outer edge of the respective vane,
   wherein the backside of each of the plurality of vanes comprises a drip-release edge that is at least partially radially spaced from the outer edge of the respective vane,
   wherein the drip-release edge extends axially in a linear manner from a bottom edge of the respective vane and axially terminates at an area underneath where the jet is expelling the fluid onto the turbine.

27. The separation assembly of claim 26, wherein, along the area underneath where the jet is expelling the fluid onto the turbine and where the drip-release edge axially terminates, the drip-release edge extends toward the outer edge of the vane along a direction substantially parallel to the bottom edge of the vane.

28. A separation assembly comprising:
- a housing;
- a jet that expels a fluid within the housing;
- a turbine positioned within the housing and positioned so as to be contacted by the fluid expelled from the jet, the fluid causing the turbine to rotate about a center rotational axis within the housing,
- the turbine comprising a first axial end, a second axial end, and a plurality of vanes extending axially relative to the center rotational axis from the first axial end to the second axial end, the plurality of vanes defining axially-extending channels between each of the plurality of vanes, the first axial end comprising a radially-extending structure that axially blocks the flow of the fluid through the first axial end, the second axial end being axially open such that fluid can flow unblocked axially through the second axial end,
- wherein the plurality of vanes extend linearly in the axial direction and do not extend outward tangentially or radially along the length of the plurality of vanes in such a manner that would axially block fluid from axially flowing from the first axial end to the second axial end of the turbine.

* * * * *